US012763453B2

(12) United States Patent
Woo et al.

(10) Patent No.: US 12,763,453 B2
(45) Date of Patent: Oct. 13, 2026

(54) ELECTRONIC DEVICE HAVING ANTENNA MODULE

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/129,624

(22) PCT Filed: Dec. 16, 2022

(86) PCT No.: PCT/KR2022/020628
§ 371 (c)(1),
(2) Date: May 13, 2025

(87) PCT Pub. No.: WO2024/128364
PCT Pub. Date: Jun. 20, 2024

(65) Prior Publication Data

US 2026/0011905 A1 Jan. 8, 2026

(51) Int. Cl.
*H01Q 1/22* (2006.01)
*H01Q 9/04* (2006.01)

(52) U.S. Cl.
CPC ............. *H01Q 1/22* (2013.01); *H01Q 9/0414* (2013.01)

(58) Field of Classification Search
None
See application file for complete search history.

(56) References Cited

U.S. PATENT DOCUMENTS 9,130,265 B1 * 9/2015 Hill .......................... H01Q 9/27
9,680,204 B2 * 6/2017 Aoki ...................... H01Q 1/273
(Continued)

FOREIGN PATENT DOCUMENTS

CN 102655260 A * 9/2012 ............... H01Q 1/38
KR 10-2006-0047567 5/2006
(Continued)

OTHER PUBLICATIONS

PCT International Application No. PCT/KR2022/020628, International Search Report dated Sep. 13, 2023, 4 pages.

*Primary Examiner* — Dameon E Levi
*Assistant Examiner* — Anh Ho
(74) *Attorney, Agent, or Firm* — LEE, HONG, DEGERMAN, KANG & WAIMEY

(57) ABSTRACT

This electronic device comprises: a metal frame; a dielectric case formed at one side of the metal frame; an air material included in the dielectric case; and an array antenna disposed in an inner region of the dielectric case, and formed in a substrate. The dielectric case includes: a first side part attached to the metal frame; a second side part corresponding to the first side part; and a third side part and a fourth side part formed between the first side part and the second side part. The side parts of the dielectric case include inner surfaces and outer surfaces corresponding to the inner surfaces. The inner surfaces include: a first inner surface spaced a first gap from a surface that is vertical to the longitudinal end of the array antenna; and a second inner surface spaced a second gap from the surface.

9 Claims, 26 Drawing Sheets

(56) References Cited

U.S. PATENT DOCUMENTS

| | | | | |
|---|---|---|---|---|
| 2018/0090847 | A1 * | 3/2018 | Romano | H01Q 9/0414 |
| 2020/0303808 | A1 * | 9/2020 | Jeon | H01Q 9/16 |

FOREIGN PATENT DOCUMENTS

| | | |
|---|---|---|
| KR | 10-2018-0023278 | 3/2018 |
| KR | 10-2020-0077743 | 7/2020 |
| KR | 10-2020-0098898 | 8/2020 |
| KR | 10-2022-0142206 | 10/2022 |

* cited by examiner (a)

(b)

(a)

(b)

(a)

(b)

(a)

(b)

(a)

(b)

ELECTRONIC DEVICE HAVING ANTENNA MODULE

CROSS-REFERENCE TO RELATED APPLICATION(S)

This application is the National Stage filing under 35 U.S.C. 371 of International Application No. PCT/KR2022/020628, filed on Dec. 16, 2022, the contents of which is hereby incorporated by reference herein in its entirety.

TECHNICAL FIELD

The present disclosure relates to an antenna module and an electronic device including the same. A particular implementation relates to an antenna module arranged in a dielectric structure having a particular shape, and an electronic device including the antenna module.

BACKGROUND ART

As functions of electronic devices diversify, an image display device such as a multimedia player having composite functions such as playback of music or video files, games, broadcasting reception, etc. may be implemented.

The image display device is an apparatus that plays image content, and receives an image from various sources and plays the image back. The image display device is implemented as various devices such as a personal computer (PC), a smartphone, a tablet PC, a laptop computer, a TV, etc. The image display apparatus such as a smart TV, etc. may provide an application for providing web content such as a web browser, etc.

A communication module including an antenna may be provided so that the electronic device such as the image display device may perform communication with a peripheral electronic device. Recently, as a display area of the image display device is enlarged, an arrangement space of the communication module including the antenna is reduced. Accordingly, there is an increasing need for arranging an antenna inside a multi-layered circuit substrate on which the communication module is implemented.

A WiFi wireless interface may be taken into account, as an interface for a communication service between electronic devices. When such a WiFi wireless interface is used, a millimeter wave (mmWave) band may be used for high-speed data transmission between electronic devices. In particular, high-speed data transmission between electronic devices may be performed using a wireless interface such as an 802.11ay wireless interface.

In relation to this, an array antenna capable of operating in a mmWave band may be mounted in an antenna module. However, electronic components such as an antenna and a transceiver circuit arranged in such an antenna module are configured to be electrically connected to each other. To do so, the transceiver circuit may be operably coupled to the antenna module, and the antenna module may be configured as a multi-layered substrate.

Antenna elements of the antenna module in a form of the multi-layered substrate may radiate a wireless signal in one side direction of the antenna module. However, there is such a problem that antenna performance significantly deteriorates when the antenna module is placed in an electronic device implemented to have a side region with a metal frame. In particular, there is such a problem that radio waves of an antenna are not radiated sufficiently toward a side region due to a large metal frame such as a display in an upper region, but are reflected and directed toward a lower region. Accordingly, it is difficult for an electronic device to perform high-speed wireless communication with other electronic devices located in the side region.

DISCLOSURE OF INVENTION

Technical Problem

One object of this specification is to solve the aforementioned problems and other drawbacks. Another object of this specification is to provide an electronic device in which an antenna module operating in a millimeter wave band and a metal frame are arranged.

Another object of this specification is to solve a problem such that an antenna that radiates a radio wave toward a side surface may not properly radiate a radio wave due to a metal frame.

Another object of this specification is to improve radiation performance in a side direction by optimizing a shape of a dielectric case arranged below a metal frame.

Another object of this specification is to perform wireless communication with various peripheral electronic devices in several directions by arranging antenna modules in difference positions below an electronic device.

Solution to Problem

To achieve these and other advantages and in accordance with the purpose of an embodiment, as embodied and broadly described herein, there is provided an electronic device including an antenna module. The electronic device includes: a metal frame constituting a side region of the electronic device; a dielectric case arranged at one side of the metal frame; an air material included in the dielectric case; and an array antenna arranged in a substrate placed in an inner region of the dielectric case. The dielectric case includes a first side part attached to the metal frame, a second side part corresponding to the first side part, and a third side part and a fourth side part each arranged between the first side part and the second side part. The side parts of the dielectric case include inner surfaces and an outer surface corresponding to the inner surfaces. The inner surfaces include: a first inner surface spaced apart, by a first gap, from a surface vertical to a longitudinal end of the array antenna; and a second inner surface spaced apart, by a second gap, from the surface vertical to the longitudinal end of the array antenna.

According to an embodiment, the inner surfaces include: a first inner surface facing and spaced apart, by a first gap, from a surface vertical to a longitudinal end of the array antenna and one surface among the third or fourth side part of the dielectric case; and a second inner surface facing and spaced apart, by a second gap, from the surface vertical to the longitudinal end of the array antenna and the one surface.

According to an embodiment, a region of the second inner surface is arranged between the first inner surface and the metal frame. The second gap may be configured to be wider than the first gap. A first thickness between the first inner surface and the outer surface may be configured to be greater than a second thickness between the second inner surface and the outer surface. The array antenna may be configured to radiate a wireless signal through the inner surfaces and the outer surface of the dielectric case.

According to an embodiment, the array antenna and the second inner surface of the dielectric case may be spaced apart from each other by a third gap. The array antenna and the first inner surface of the dielectric case may be spaced apart from each other by a fourth gap. The third gap may be configured to be wider than the fourth gap.

According to an embodiment, the array antenna may be arranged near a region of the first inner surface.

According to an embodiment, a connecting portion electrically connected to the metal frame may be further arranged in a ground region located inside the substrate.

According to an embodiment, the substrate in which the array antenna is arranged may be configured as a multi-layered substrate. Antenna elements of the array antenna may be arranged on a particular layer of the multi-layered substrate. The antenna elements may be configured to radiate a beamformed wireless signal through one side surface of the multi-layered substrate and the first inner surface and the outer surface of the dielectric case.

According to an embodiment, the antenna elements may constitute, on the particular layer of the multi-layered substrate, a 1×N array antenna in which the antenna elements are arranged to be apart from each other in one axial direction by a predetermined gap. The antenna elements may be end-fire radiators that radiate wireless signals through the one side surface of the multi-layered substrate.

According to an embodiment, the 1×N array antenna may generate a first radiation pattern having a first beam width in the one axial direction. A second radiation pattern having a second beam width may be generated within a predetermined angle in a lower direction of the metal case. The second beam width may be greater than the first beam width.

An electronic device having an antenna module according to this specification includes a metal frame constituting a side region of the electronic device; a dielectric case arranged at one side of the metal frame; an air material included in the dielectric case; and an array antenna arranged in a substrate placed in an inner region of the dielectric case. The dielectric case includes a first side part attached to the metal frame, a second side part corresponding to the first side part, and a third side part and a fourth side part each arranged between the first side part and the second side part. The side parts of the dielectric case include inner surfaces and an outer surface corresponding to the inner surfaces. The outer surface is slantedly arranged with respect to a vertical axis.

According to an embodiment, the inner surface may include: a first inner surface facing and spaced apart, by a first gap, from a surface vertical to a longitudinal end of the array antenna and one surface among the third or fourth side part of the dielectric case; and a second inner surface facing and spaced apart, by a plurality of gaps, from the surface vertical to the longitudinal end of the array antenna and the one surface. A region of the second inner surface may be arranged between the first inner surface and the metal frame. The plurality of gaps may be configured to be wider than the first gap. The first inner surface and the outer surface may constitute a plurality of thicknesses. The second inner surface and the outer surface may be configured to have a uniform thickness. The array antenna may be configured to radiate a wireless signal through the inner surface and the outer surface of the dielectric case, the outer surface being slantedly arranged.

According to an embodiment, the array antenna and the second inner surface of the dielectric case may be spaced apart from each other by a third gap. The array antenna and the first inner surface of the dielectric case are spaced apart from each other by a fourth gap. The third gap may be configured to be wider than the fourth gap.

According to an embodiment, the array antenna may be arranged near a region of the first inner surface.

According to an embodiment, a connecting portion electrically connected to the metal frame may be further arranged in a ground region located inside the substrate.

According to an embodiment, a length of the first side part may be configured to be greater than a length of the second side part.

According to an embodiment, the outer surface of the dielectric case may be slantedly arranged at an angle of 15 to 45 degrees with respect to a vertical axis.

According to an embodiment, the outer surface of the dielectric case may be slantedly arranged at an angle of 60 degrees or less with respect to a vertical axis.

According to an embodiment, the substrate in which the array antenna is arranged is configured as a multi-layered substrate. Antenna elements of the array antenna may be arranged on a particular layer of the multi-layered substrate. The antenna elements may be configured to radiate a beamformed wireless signal through one side surface of the multi-layered substrate and the first inner surface and the outer surface of the dielectric case.

According to an embodiment, the antenna elements may constitute, on the particular layer of the multi-layered substrate, a 1×N array antenna in which the antenna elements are arranged to be apart from each other in one axial direction by a predetermined gap. The antenna elements may be end-fire radiators that radiate wireless signals through the one side surface of the multi-layered substrate.

According to an embodiment, the 1×N array antenna may generate a first radiation pattern having a first beam width in the one axial direction. A second radiation pattern having a second beam width may be generated within a predetermined angle in a lower direction of the metal case. The second beam width may be greater than the first beam width.

According to an embodiment, the multi-layered substrate may be arranged to be spaced apart from the second inner surface which is a lower region of the dielectric case. The array antenna may be configured to radiate a wireless signal in a frequency band between 57 GHz and 70 GHz. A height from the particular layer of the multi-layered substrate on which the antenna elements are arranged to an upper end of the second inner surface may be configured in a range of $0.08\lambda_0$ to $0.9\lambda_0$.

According to an embodiment, a second height for which the air material is arranged from the upper end of the second inner surface to an upper end of the first inner surface of the dielectric case may be configured to have a value of $0.04\lambda_0$ or greater. A distance between the second inner surface of the dielectric case and the multi-layered substrate may be configured to have a value of $0.6\lambda_0$ or less.

According to an embodiment, the connecting portion may be implemented as a metal case arranged on an upper portion of the multi-layered substrate. The antenna elements may be arranged in a first region corresponding to a radiator region of the multi-layered substrate. The metal case may be arranged in a second region corresponding to the ground region of the multi-layered substrate. A distance gc from a position in which the antenna elements of the array antenna may be arranged to one side end of the metal case is configured as $(n+0.1)*\lambda_0<gc<(n+0.7)*\lambda_0$, and n is 0 or a natural number.

Advantageous Effects of Invention

Hereinafter, technical effects of an antenna module arranged in a dielectric case according to this specification and an electronic device including the antenna module are to be described.

According to an embodiment, an antenna module may be arranged inside a dielectric case on a lower region of a metal frame of an electronic device to radiate a radio wave toward a side region in a millimeter wave band.

According to an embodiment, an antenna module that radiates a radio wave toward a side region may be arranged inside a dielectric case having an outer surface of a slanted structure to radiate a radio wave toward a side region even in a structure in which a metal frame is located.

According to an embodiment, radiation performance in a side direction may be enhanced by optimizing an outer shape of a dielectric case arranged below the metal frame to have a slanted structure, and placing a dielectric structure inside the dielectric structure to have a protruding structure while arranging an air layer.

According to an embodiment, antenna radiation performance may be enhanced using a partial dielectric technique for arranging an air layer in a dielectric case, a diagonal-type dielectric structure in which an outer surface is slantedly arranged, and a metal fixing device.

According to an embodiment, an antenna module may be arranged in different positions in a lower portion of an electronic device to perform wireless communication with various peripheral electronic devices in several directions.

Further scope of applicability of this specification will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1:
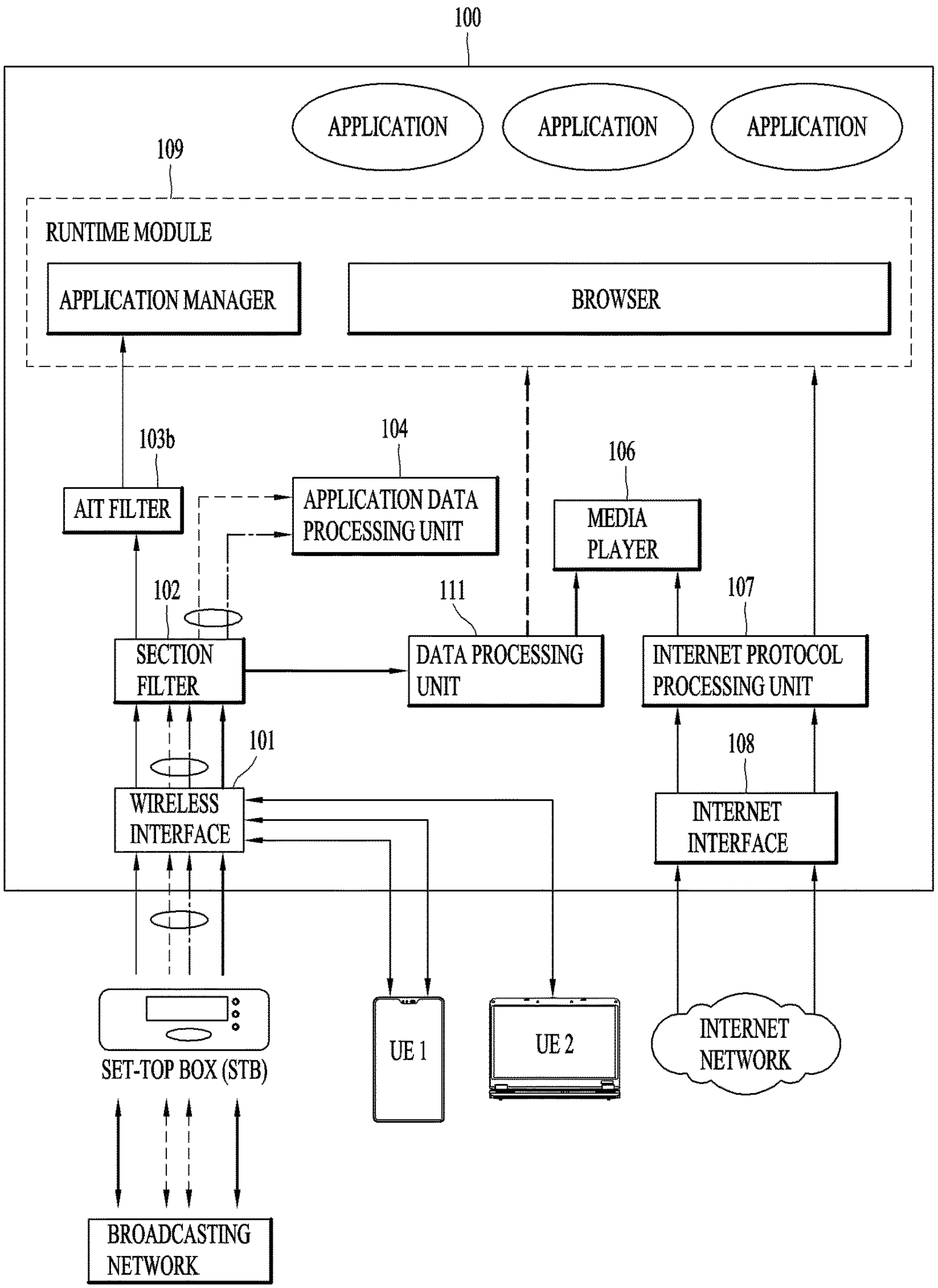
FIG. 1 is a diagram schematically illustrating an example of a whole wireless audiovisual (AV) system including an image display device according to one embodiment of this specification.

Hereinafter, embodiments disclosed herein will be described in detail with reference to the accompanying drawings, and the same or similar elements are designated with the same numeral references, regardless of the numerals in the drawings, and their redundant description will be omitted. Suffixes "module" and "unit" used for components used in the following description are merely intended for easy description of this specification, and each suffix itself is not intended to give any special meaning or function. In describing the embodiments disclosed herein, moreover, the detailed description will be omitted when specific description for publicly known technologies to which the disclosure pertains is judged to obscure the gist of this specification. The accompanying drawings are used to help easily understand the technical idea of this specification and it should be understood that the idea of this specification is not limited by the accompanying drawings. The idea of this specification should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the another element or intervening elements may also be present. In contrast, when an element is referred to as being "directly connected with" another element, there are no intervening elements present.

A singular representation may include a plural representation unless it represents a definitely different meaning from the context.

Terms "include" or "has" as used herein should be understood that they are intended to indicate the existence of a feature, a number, a step, an element, a component, or a combination thereof disclosed in this specification, and it may also be understood that the existence or additional possibility of one or more other features, numbers, steps, elements, components, or combinations thereof are not excluded in advance.

An electronic device described herein may include a mobile phone, a smartphone, a laptop computer, a digital broadcasting terminal, a personal digital assistant (PDA), a portable multimedia player (PMP), a navigation system, a slate personal computer (PC), a tablet PC, an ultrabook, a wearable device, (e.g., a smartwatch, smart glasses, a head mounted display (HMD)), or the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

FIG. 1 is a diagram schematically illustrating an example of a whole wireless audiovisual (AV) system including an image display device according to one embodiment of this specification.

As illustrated in FIG. 1, an image display device 100 according to another embodiment of this specification is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be configured to be connected to a server or another electronic device via a wireless communication system. As an example, the image display device 100 needs to provide an 802.111ay communication service operating in a millimeter wave (mmWave) band to transmit or receive large-capacity data at a high speed.

The mmWave band may be any frequency band in a range of 10 GHz to 300 GHz. In this disclosure, the mmWave band may include an 802.11ay band of a 60 GHz band. In addition, the mmWave band may include a 5G frequency band of a 28 GHz band or the 802.11ay band of the 60 GHz band. The 5G frequency band may be set to about 24 to 43 GHz band and the 802.11ay band may be set to 57 to 70 GHz or 57 to 63 GHz band, but are not limited thereto.

Meanwhile, the image display device 100 may wirelessly transmit or receive data to/from an electronic device in a periphery of the image display device 100, e.g., a set-top box or another electronic device via the wireless interface. As an example, the image display device 100 may transmit or receive wireless AV data to/from a set-top box or another electronic device, e.g., a mobile terminal arranged in front of or below the image display device.

The image display device 100 includes, for example, a wireless interface 101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b*.

Through the broadcast interface 101*b*, application information table (AIT) data, real-time broadcast content, application data, and a stream event are received. Meanwhile, the real-time broadcast content may be referred to as linear audio/video (A/V) content.

The section filter 102*b* performs section filtering on four pieces of data received through the wireless interface 101*b* to transmit the AIT data to the AIT filter 103*b*, the linear A/V content to the data processing unit 111*b*, and the stream events and the application data to the application data processing unit 104*b*.

Meanwhile, the non-linear A/V content and the application data are received through the Internet interface 108*b*. The non-linear A/V content may be, for example, a content on demand (COD) application. The non-linear A/V content is transmitted to the media player 106*b*, and the application data is transmitted to the runtime module 109*b*.

Further, the runtime module 109*b* includes, for example, an application manager and a browser as illustrated in FIG. 1. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device is described in detail. In relation to this, the wireless interface for communication between electronic devices may be a WiFi wireless interface, but is not limited thereto. As an example, a wireless interface supporting an 802.11ay standard may be provided for high-speed data transmission between electronic devices.

The 802.11ay standard is a subsequent standard for increasing a throughput of an 802.11ad standard to 20 Gbps or greater. An electronic device supporting the 802.11ay wireless interface may be configured to use a frequency band of about 57 to 64 GHz. The 802.11ay wireless interface may be configured to provide backward compatibility for an 802.11ad wireless interface. Meanwhile, the electronic device providing the 802.11ay wireless interface may be configured to provide coexistence with a legacy device using the same band.

In relation to a wireless environment for the 802.11ay standard, a configuration may be such that a coverage of 10 meters or longer is provided in an indoor environment, and a coverage of 100 meters or longer is provided in an outdoor environment with a line of sight (LOS) channel condition.

The electronic device supporting the 802.11ay wireless interface may be configured to provide visual reality (VR) headset connectivity, support server backups, and support cloud applications that need low latency.

An ultra short range (USR) communication scenario, i.e., a near field communication scenario which is a use case of the 802.11ay wireless interface is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, an 8K UHD wireless transfer at smart home usage model may be taken into account. In the smart home usage model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in a mmWave band and an electronic device including the array antenna is described with reference to the accompanying drawings. It will be apparent to those skilled in the art that this specification may be embodied in other specific forms without departing from the spirit or essential characteristics thereof.

Figure 2:
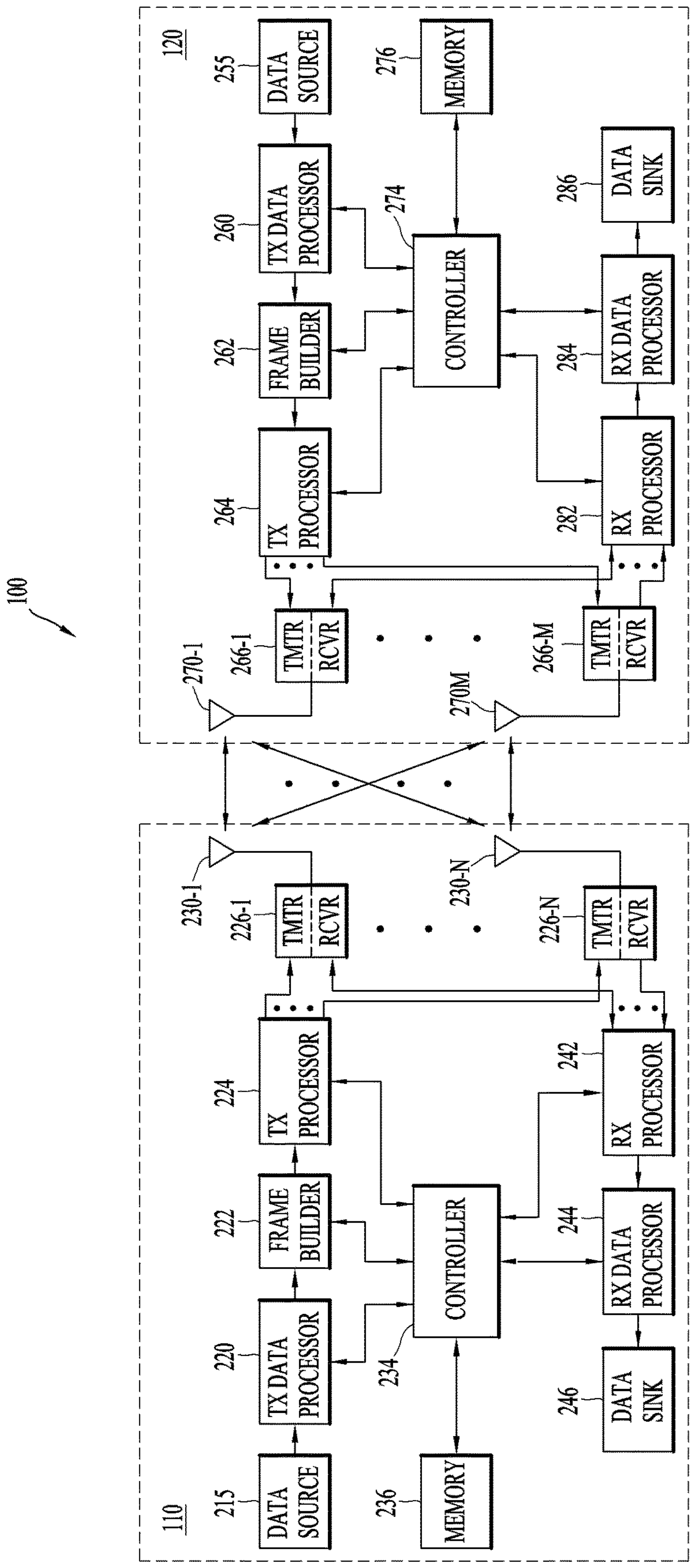
FIG. 2 illustrates a detailed configuration of electronic devices that support a wireless interface according to this specification.

FIG. 2 illustrates a detailed configuration of electronic devices that support a wireless interface according to this specification. FIG. 2 illustrates a block diagram of an access point 110 (generally, a first wireless node) and an access terminal 120 (generally, a second wireless node) in a wireless communication system. The access point 110 is a transmitting entity for downlink transmission and a receiving entity for uplink transmission. The access terminal 120 is a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, the set-top box (STB) of FIG. 1 may be the access point 110, and an electronic device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission data processor 220, a frame builder 222, a transmission processor 224, a plurality of transceivers 226-1 to 226-N, and a plurality of antennas 230-1 to 230-N. The access point 110 also includes a controller 234 configured to control operations of the access point 110.

To transmit data, the access point 110 includes a transmission data processor 220, a frame builder 222, a transmission processor 224, a plurality of transceivers 226-1 to 226-N, and a plurality of antennas 230-1 to 230-N. The access point 110 also includes a controller 234 configured to control operations of the access point 110.

During operation, the transmission data processor 220 receives data (e.g., data bits) from a data source 215, and processes the data for transmission. For example, the transmission data processor 220 may encode data (e.g., data bits) into encoded data, and modulate the encoded data into data symbols. The transmission data processor 220 may support different modulation and coding schemes (MCSs). For example, the transmission data processor 220 may the encode data at any one of a plurality of different coding rates (e.g., using low-density parity check (LDPC) encoding). In addition, the transmission data processor 220 may modulate the encoded data using any one of a plurality of different modulation schemes including, but not limited to, BPSK, QPSK, 16 QAM, 64 QAM, 64 APSK, 128 APSK, 256 QAM, and 256 APSK.

The controller 234 may transmit, to the transmission data processor 220, a command for specifying an MCS to be used (e.g., based on channel conditions for downlink transmission). The transmission data processor 220 may encode and modulate the data received from the data source 215 according to the specified MCS. It needs to be recognized that the transmission data processor 220 may perform additional processing on the data, such as data scrambling and/or other processing. The transmission data processor 220 outputs the data symbols to the frame builder 222.

The frame builder 222 builds a frame (also referred to as a packet) and inserts the data symbols into a data payload of the frame. The frame may include a preamble, a header, and a data payload The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the transmission processor 224.

The transmission processor 224 processes the frame for transmission on downlink. For example, the transmission processor 224 may support different transmission modes, e.g., an orthogonal frequency-division multiplexing (OFDM) transmission mode and a single-carrier (SC) transmission mode. In this example, the controller 234 may transmit, to the transmission processor 224, a command for specifying a transmission mode to be used, and the transmission processor 224 may process the frame for transmission according to the specified transmission mode. The transmission processor 224 may apply a spectrum mask to the frame so that a frequency configuration of a downlink signal complies with particular spectrum requirements.

The transmission processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The transmission processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a transmission data processor 260, a frame builder 262, a transmission processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 for controlling operations of the access terminal 120.

The transceivers 266-1 to 266-M receive and process (e.g., convert to analog, amplify, filter, and frequency up-convert) an output from the transmission processor 264 for transmission via one or more of the antennas 270-1 to 270-M. For example, the transceiver 266 may up-convert the output from the transmission processor 264 into a transmission signal having a frequency in a 60 GHz band. Accordingly, the antenna module described herein may be configured to perform a beamforming operation in the 60 GHz band, for example, in a band of about 57 to 63 GHZ. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layered circuit substrate. To do so, among the antennas 270-1 to 270-M, an antenna that operates with vertical polarization may be vertically arranged inside the multi-layered circuit substrate.

To receive data, the access point 110 includes a reception processor 242 and a reception data processor 244. During operation, the transceivers 226-1 to 226-N receive a signal (e.g., from the access terminal 120) and spatially process (e.g., frequency down-convert, amplify, filter, and digitally convert) the received signal.

The reception processor 242 receives outputs from the transceivers 226-1 through 226-N and processes the outputs to recover data symbols. For example, the access point 110 may receive data from a frame (e.g., from the access terminal 120). In this example, the reception processor 242 may detect a start of the frame using a short training field (STF) sequence in a preamble of the frame. The reception processor 242 may also use the STF for automatic gain control (AGC) adjustment. The reception processor 242 may also perform channel estimation (e.g., using a channel estimation (CE) sequence in the preamble of the frame), and perform channel equalization on the received signal based on the channel estimation.

The reception data processor 244 receives the data symbols from the reception processor 242 and an indication of a corresponding MSC scheme from the controller 234. The reception data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the reception processor 242 may process the received signal according to a selected transmission mode. In addition, as described above, the transmission processor 264 may support MIMO transmission. In this case, the access point 110 includes the plurality of antennas 230-1 to 230-N and the plurality of transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layered circuit substrate. To do so, among the antennas 230-1 to 230-M, an antenna that operates with vertical polarization may be vertically arranged inside the multi-layered circuit substrate.

Meanwhile, each transceiver receives and processes (e.g., frequency down-converts, amplifies, filters, and digitally converts) a signal from each antenna. The reception processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
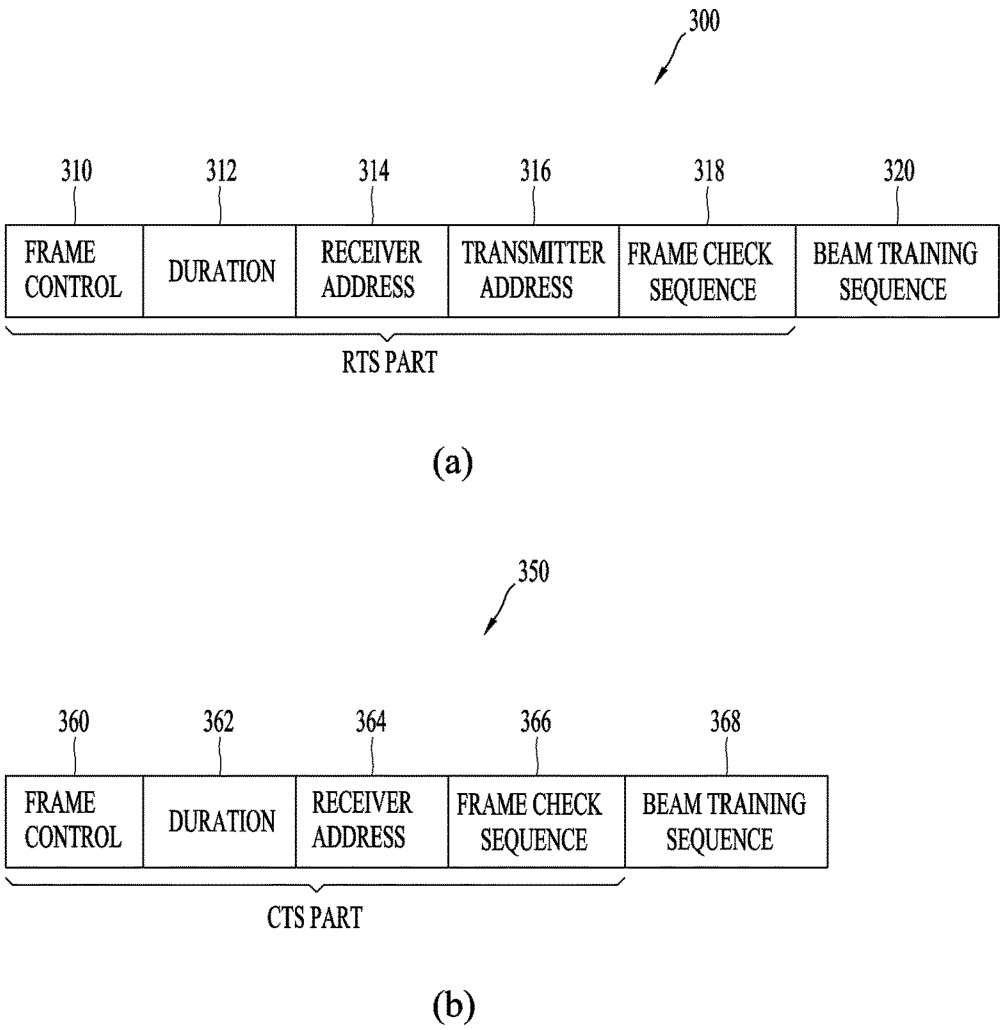
FIG. 3A illustrates a request-to-send frame (RTS) and a clear-to-send (CTS) frame according to this specification.

Meanwhile, an electronic device supporting the 802.11ay wireless interface described herein determines whether a communication medium may be used to communicate with another electronic device. To do so, the electronic device transmits a request-to-send (RTS)-TRN frame including a RTS part and a first beam training sequence. In relation to this, FIG. 3A illustrates a request-to-send frame (RTS) and a clear-to-send (CTS) frame according to this specification. In relation to this, a transmission device may use the RTA frame to determine whether a communication medium may be used to transmit one or more data frames to a destination device. In a response to receiving the RTS frame, the destination device transmits the CTS frame back to the transmission device when the communication medium may be used. In a response to receiving the CTS frame, the transmission device transmits one or more data frames to the destination device. In a response to successfully receiving the one or more data frames, the destination device transmits one or more acknowledgment ("ACK") frames to the transmission device.

Referring to (a) of FIG. 3A, a frame 300 includes the RTS part including a frame control field 310, a duration field 312, a receiver address field 314, a transmitter address field 316, and a frame check sequence field 318. To improve communication and reduce interference, the frame 300 further includes a beam training sequence field 320 for configuring respective antennas of the destination device and one or more neighboring devices.

Referring to (b) of FIG. 3A, a CTS frame 350 includes a CTS part containing a frame control field 360, a duration field 362, a receiver address field 364, and a frame check sequence field 366. To improve communication and reduce interference, the frame 350 further includes a beam training sequence field 368 for configuring respective antennas of the transmission device and one or more neighboring devices.

The beam training sequence fields 320 and 368 may conform to a training (TRN) sequence according to the IEEE 802.11ad or 802.11ay standard. The transmission device may use the beam training sequence field 368 to configure an antenna of the transmission device for directional transmission to the destination device. Meanwhile, transmission devices may use the beam training sequence field to configure respective antennas of the transmission devices to prevent transmission interference at the destination device. In this case, the beam training sequence field may be used to configure the respective antennas of the transmission devices to generate an antenna radiation pattern with nulls targeting the destination device.

Figure 3B:
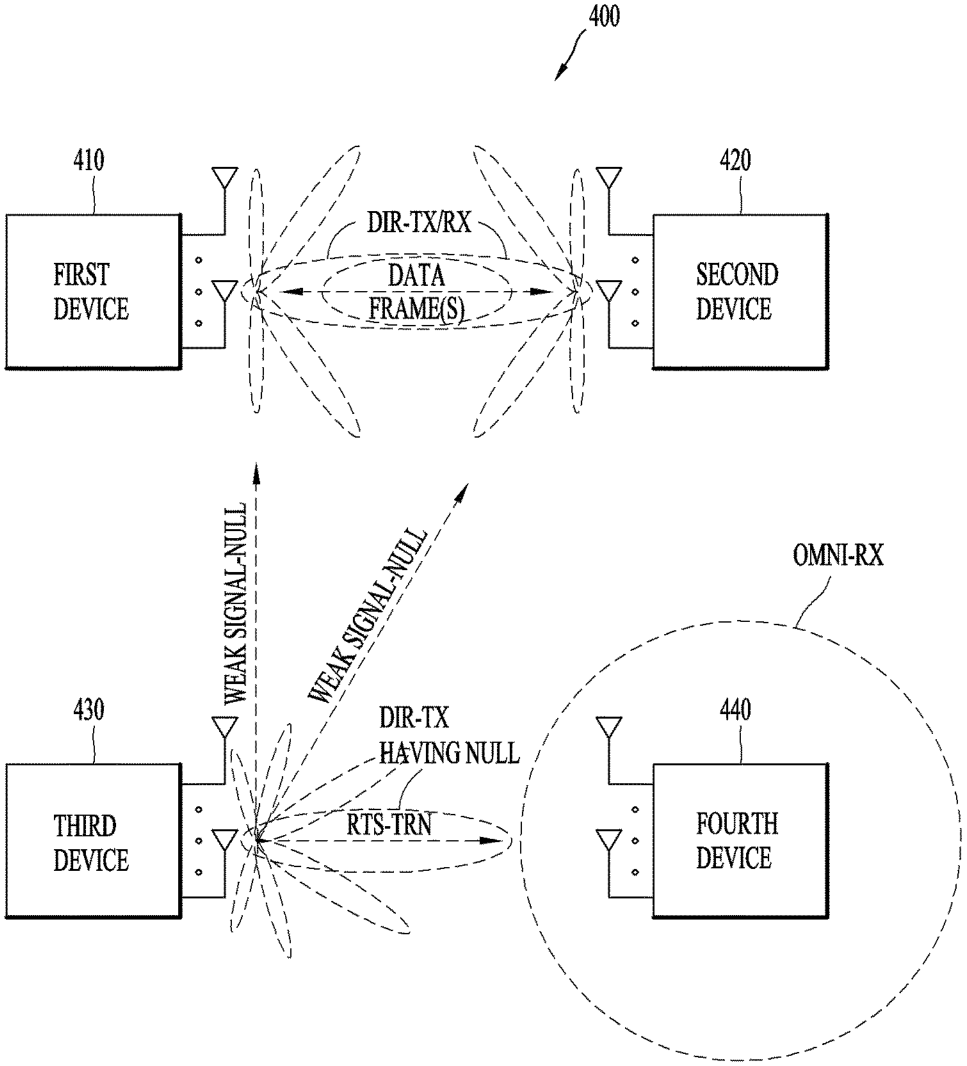
FIG. 3B illustrates a block diagram of a communication system 400 according to an example of this specification.

Accordingly, electronic devices supporting the 802.11ay wireless interface may provide an initial beam to have a low interference level with each other, using a beamformed pattern determined according to a beam training sequence. In relation to this, FIG. 3B illustrates a block diagram of a communication system 400 according to an example of this specification. As illustrated in FIG. 3B, first and second devices 410 and 420 may improve communication performance by matching directions of main beams with each other. To reduce interference with a third device 430, the first and second devices 410 and 420 may create a signal-null having a weak signal strength in a particular direction.

In relation to the main beams and the creation of the signal-null, a plurality of electronic devices described herein may be configured to perform beamforming through an array antenna. Referring to FIG. 3B, some of the electronic devices may be configured to communicate with an array antenna of another electronic device through a single antenna. In relation to this, when communication is performed through a single antenna, a beam pattern is generated as an omnidirectional pattern.

Referring to FIG. 3B, it is shown that the first to third devices 410 to 430 perform beamforming and a fourth device 440 does not perform beamforming. However, performance of beamforming is not limited thereto. Accordingly, three of the first to fourth devices 410 may be configured to perform beamforming, and the other may be configured not to perform beamforming.

As another example, only one of the first to fourth devices 410 may be configured to perform beamforming, and the other three devices may be configured not to perform beamforming. As another example, two of the first to fourth devices 410 may be configured to perform beamforming but the other two may be configured not to perform beamforming. As another example, all of the first to fourth devices 410 may be configured to perform beamforming.

Referring to FIGS. 3A and 3B, the first device 410 determines that the first device 410 is an intended receiving device for the CTS-TRN frame 350, based on an address indicated in the receiver address field 364 of the CTS-TRN frame 350. In response to the determining as being the intended receiving device for the CTS-TRN frame 350, the first device 410 may selectively use a beam training sequence in the beam training sequence field 368 of the received CTS-TRN frame 350 to configure an antenna of the first device 410 for directional transmission substantially targeting the second device 420. That is, the antenna of the first device 410 is configured to generate an antenna radiation pattern having a primary lobe (e.g., a highest gain lobe) substantially targeting the second device 420 and non-primary lobes targeting other directions.

The second device 420 is already aware of a direction toward the first device 410 on a basis of the beam training sequence of the beam training sequence field 320 in an RTS-TRN frame 300 previously received by the second device 420. Thus, the second device 420 may configure an antenna of the second device 420 selectively for directional reception targeting the first device 410 (e.g., a primary antenna radiation lobe). Therefore, while the antenna of the first device 410 is configured for the directional transmission to the second device 420 and the antenna of the second device 420 is configured for the directional reception from the first device 410, the first device 410 transmits one or more data frames to the second device 420. Accordingly, the first and second devices 410 and 420 perform directional transmission/reception DIR-TX/RX of one or more data frames through the primary lobe (the main beam).

Meanwhile, the first and second devices 410 and 420 may partially modify a beam pattern of the third device 430 to reduce interference with the third device 430 due to the antenna radiation pattern having the non-primary lobes.

In relation to this, the third device 430 determines that the third device 430 is not the intended receiving device for the CTS-TRN frame 350 on a basis of an address indicated in the receiver address field 364 of the CTS-TRN frame 350. In a response to the determining that the third device 430 is not the intended receiving device for the CTS-TRN frame 350, the third device 430 uses the beam training sequence in the beam training sequence field 368 of the received CTS-TRN 350 and a sequence of the beam training sequence field 320 in the RTS-TRN frame 300 previously received, to configure the antenna of the third device 430 to generate antenna radiation patterns having nulls substantially targeting the second device 420 and the first device 410, respectively. The nulls may be based on estimated angles of arrivals of the RTS-TRN frame 300 previously received, and the CTS-TRN frame 350. In general, the third device 430 generates antenna radiation patterns having desired signal powers, rejections or gains targeting the first device 410 and the second device 420, respectively (for example, to achieve an estimated interference in the first and second devices 410 and 420 to be equal to or less than a defined threshold value (e.g., to acquire desired BER, SNR, SINR and/or other one or more communication properties)).

The third device 430 may configure an antenna transmission radiation pattern of the third device 430 by estimating antenna gains in directions toward the first and second devices 410 and 420, estimating antenna reciprocity differences between the third device 430 and the first and second devices 410 and 420 (e.g., a transmission antenna gain minus a reception antenna gain), and respectively calculating the antenna gains and the antenna reciprocity differences throughout one or more sectors to determine estimated interferences corresponding to the first and second devices 410 and 420.

The third device 430 transmits the RTS-TRN frame 300 intended for the fourth device 440 and to be received by the fourth device 440. As long as the first and second devices 410 and 420 perform communication on a basis of durations indicated in duration fields of the duration fields 312 and 362 of the RTS-TRN frame 300 and the CTS-TRN frame 350, respectively, the third device 430 maintains an antenna configuration having nulls targeting the first and second devices 410 and 420. Since the antenna of the third device 430 is configured to generate nulls targeting the first device 410 and the second device 420, transmission of the RTS-TRN frame 300 by the third device 430 may generate reduced interference in the first device 410 and the second device 420, respectively.

Accordingly, electronic devices supporting the 802.11ay wireless interface disclosed herein may configure a signal null direction in a particular direction to reduce interference while matching main beam directions with each other using an array antenna. To do so, a plurality of the electronic devices may configure an initial beam direction through a beam training sequence and change a beam direction through a periodically updated beam training sequence.

As described above, for high-speed data communication between the electronic devices, beam directions should be configured to match each other. In addition, a loss of a wireless signal transmitted to an antenna element needs to be minimized for high-speed data communication. To do so, an array antenna needs to be arranged in a multi-layered substrate on which a radio frequency integrated chip (RFIC) is arranged. In addition, for radiation efficiency, the array antenna needs to be arranged adjacent to a side region in the multi-layered substrate.

In addition, in order to adapt to a change in a wireless environment, a beam training sequence between the electronic devices needs to be updated. To update the beam training sequence, the RFIC needs to periodically transceive signals with a processor such as a modem. Therefore, to minimize update delay time, transception of a control signal between the RFIC and the modem needs to be performed within short time. To do so, a physical length of a connection path between the RFIC and the modem needs to be reduced. To do so, the modem may be arranged on a multi-layered substrate on which the array antenna and the RFIC are arranged. Alternatively, a connection length between the RFIC and the modem may be configured to be minimized in a structure in which the array antenna and the RFIC are arranged on the multi-layered substrate and the modem is arranged on a main substrate. In relation to this, a detailed structure will be described with reference to FIG. 5C.

Figure 4:
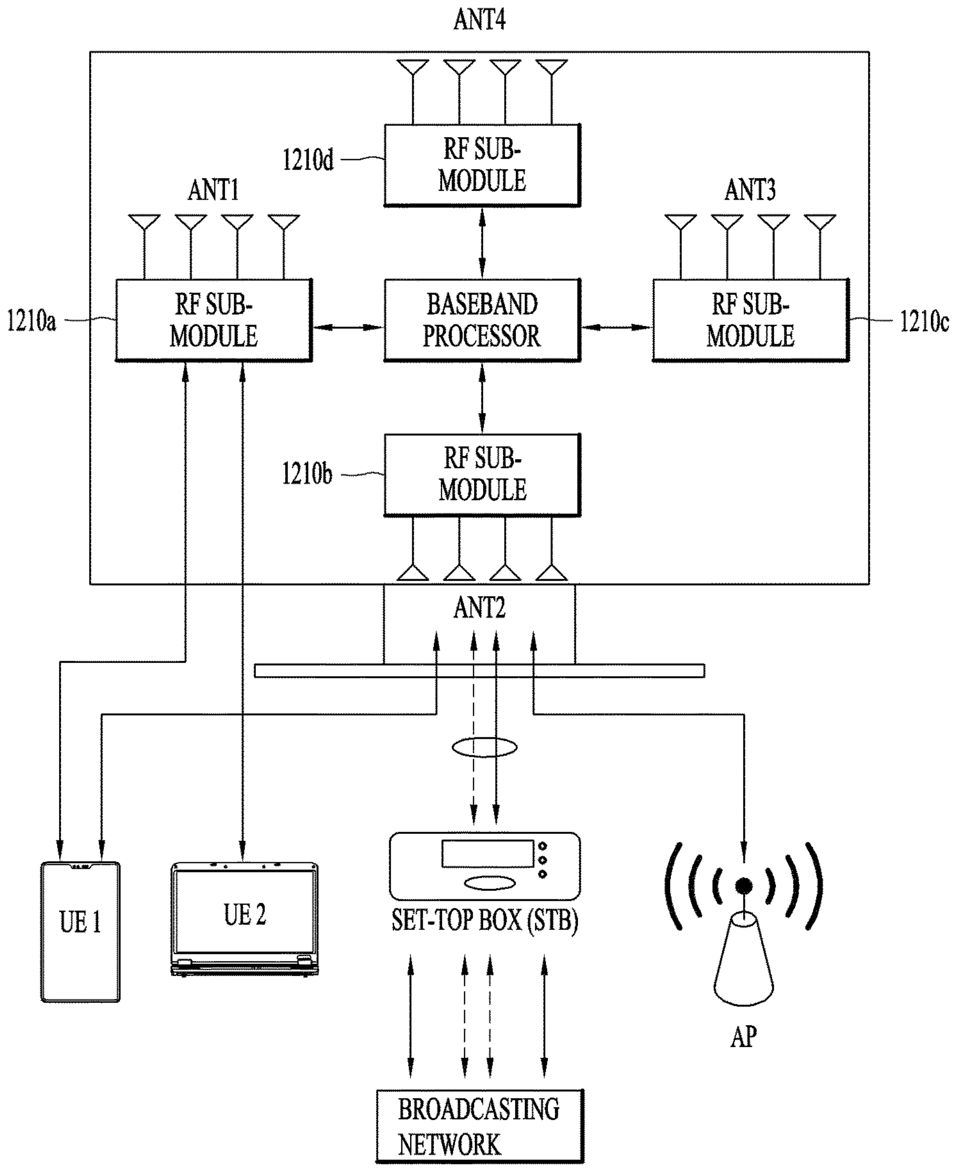
FIG. 4 illustrates an electronic device in which a plurality of antenna modules and a plurality of transceiver circuit modules are arranged, according to an embodiment.

Hereinafter, an electronic device having an array antenna that may operate in a mm Wave band according to this specification will be described. In relation to this, FIG. 4 illustrates an electronic device in which a plurality of antenna modules and a plurality of transceiver circuit modules are arranged, according to an embodiment. Referring to FIG. 4, a home appliance in which the plurality of antenna modules and the plurality of transceiver circuit modules are arranged may be a television, but is not limited thereto. Accordingly, in this specification, a home appliance in which the plurality of antenna modules and the plurality of transceiver circuit modules are arranged may include any home appliance or display device each configured to support a communication service in a millimeter wave band.

Referring to FIG. 4, an electronic device 1000 includes a plurality of antenna modules ANT1 to ANT4, and a plurality of transceiver circuit modules 1210*a* to 1210*d*. In relation to this, the plurality of transceiver circuit modules 1210*a* to 1210*d* may correspond to a transceiver circuit 1250 as described above. Alternatively, the plurality of transceiver circuit modules 1210*a* to 1210*d* may be a partial configuration of the transceiver circuit 1250 or a partial configuration of a front end module arranged between an antenna module and the transceiver circuit 1250.

The plurality of antenna modules ANT 1 to ANT4 may be configured as an array antenna in which a plurality of antenna elements are arranged. A number of elements of the antenna modules ANT 1 to ANT4 is not limited to two, three, four, or the like as illustrated in the drawing. For example, the number of the elements of the antenna modules ANT 1 to ANT4 may extend to 2, 4, 8, 16, or the like. In addition, the elements of the antenna modules ANT 1 to ANT4 may be selected in a same number or in different numbers. The plurality of antenna modules ANT 1 to ANT4 may be arranged in different regions in a display, or in a lower portion or on a side surface of the electronic device. The plurality of antenna modules ANT 1 to ANT4 may be arranged in an upper portion, a left portion, a lower portion, or a right portion of the display. However, an arrangement structure thereof is not limited thereto. As another example, the antenna modules ANT 1 to ANT4 may be arranged in an upper left portion, an upper right portion, a lower left portion, or a lower right portion of the display.

The antenna modules ANT 1 to ANT4 may be configured to transmit or receive a signal in a particular direction in any frequency band. For example, the antenna modules ANT 1 to ANT4 may operate in any one of a 28 GHz band, a 39 GHz band, and a 64 GHz band.

The electronic device may maintain a connection state with different entities through two or more of the antenna modules ANT 1 to ANT4, or perform a data transmitting or receiving operation to maintain the connection state described above. In relation to this, the electronic device corresponding to a display device may transmit or receive data with a first entity through the first antenna module ANT1. Also, the electronic device may transmit or receive data with a second entity through the second antenna module ANT2. As an example, the electronic device may transmit or receive data to/from a mobile terminal UE through the first antenna module ANT1. The electronic device may transmit or receive data with a control device such as a set-top box or an access point (AP) through the second antenna module ANT2.

Data may be transmitted or received with another entity through other antenna modules, e.g., the antenna modules ANT3 and ANT4, i.e., third and fourth antenna modules. As another example, dual connection or MIMO may be performed through at least one of the first and second entities both previously connected via the third antenna module ANT3 and the fourth antenna module ANT4.

Mobile terminals UE1 and UE2 may be arranged in a front of the electronic device, and configured to communicate with the first antenna module ANT1. Meanwhile, the set-top box (STB) or the access point AP may be arranged in a lower portion of the electronic device, and configured to communicate with the second antenna module ANT2, but is not limited thereto. As another example, the second antenna module ANT2 may include both a first antenna radiating toward a lower region and a second antenna radiating toward a front region. Accordingly, the second antenna module ANT2 may communicate with the set-top box (STB) or the access point AP through the first antenna, and with one of the mobile terminals UE1 and UE2 through the second antenna.

Meanwhile, one of the mobile terminals UE1 and UE2 may be configured to perform MIMO with the electronic device. As an example, the mobile terminal UE1 may be configured to perform MIMO while performing beamforming with the electronic device. As described above, the electronic device corresponding to the image display device may perform high-speed communication with another electronic device or the set-top box STB through a WiFi wireless interface. As an example, the electronic device may perform high-speed communication in a 60 GHz band with another electronic device or the set-top box STB through the 802.11ay wireless interface.

Meanwhile, the transceiver circuit modules 1210*a* to 1210*d* may operate to process a transmission signal and a reception signal in an RF frequency band. Here, the RF frequency band may be any frequency band of a millimeter band, such as a 28 GHz band, a 39 GHz band, and a 64 GHz band, as described above. The transceiver circuit modules 1210*a* to 1210*d* may be referred to as RF sub-modules 1210*a* to 1210*d*. In this case, the number of the RF sub-modules 1210*a* to 1210*d* is not limited to four, and may be changed to an arbitrary number of two or more depending on applications.

In addition, the RF sub-modules 1210*a* to 1210*d* may include an up-conversion module and a down-conversion module that convert a signal in the RF frequency band into a signal in an IF (intermediate frequency) band or convert a signal in the IF frequency band into a signal in the RF frequency band. To do so, the up-conversion module and the down-conversion module may respectively include a local oscillator (LO) capable of performing up-frequency conversion and down-frequency conversion.

Meanwhile, the plurality of RF sub-modules 1210*a* to 1210*d* may be configured such that a signal is transmitted from one module among the plurality of transceiver circuit modules to an adjacent transceiver circuit module. Accordingly, the transmitted signal may be configured to transmitted to all of the plurality of transceiver circuit modules 1210*a* to 1210*d* at least once.

To do so, a data transmission path having a loop structure may be added. In relation to this, the RF sub-modules 1210*b* and 1210*c* adjacent to each other may bidirectionally transmit a signal through a transmission path P2 having the loop structure.

Alternatively, a data transmission path having a feedback structure may be added. In relation to this, through the data transmission path having the feedback structure, at least one sub-module 1210*c* may transmit a signal to the other sub-modules 1210*a*, 1210*b*, and 1210*c* unidirectionally.

The plurality of RF sub-modules may include first to fourth RF sub-modules 1210*a* to 1210*d*. In relation to this, a signal from the first RF sub-module 1210*a* may be transmitted to the RF sub-module 1210*b* and the fourth RF sub-module 1210*d* both adjacent thereto. In addition, the second RF sub-module 1210*b* and the fourth RF sub-module 1210*d* may transmit the signal to the third RF sub-module 1210*c* adjacent thereto. At this time, when bidirectional transmission between the second RF sub-module 1210*b* and the third RF sub-module 1210*c* may be performed as shown in FIG. 4, this may be referred to as a loop structure. On the other hand, when only unidirectional transmission may be performed between the second RF sub-module 1210*b* and the third RF sub-module 1210*c*, this may be referred to as a feedback structure. Meanwhile, in the feedback structure, at least two signals may be transmitted to the third RF sub-module 1210*c*.

However, a structure is not limited thereto, and a baseband module may be included only in a particular module among the first to fourth RF sub-modules 1210*a* to 1210*d* depending on applications. Alternatively, depending on an application, a baseband module may not be included in the first to fourth RF sub-modules 1210*a* to 1210*d*, but may be configured as a separate controller, that is, a baseband processor 1400. For example, a control signal may be transmitted only by a separate controller, that is, the baseband processor 1400.

Hereinafter, a particular configuration and function of the electronic device illustrated in FIG. 1 and including the wireless interface of FIG. 2 are to be described. Transmission or reception of data between electronic devices needs to be performed using a communication service between the electronic devices in a mmWave band. In relation to this, a wireless audio-video (AV) service and/or high-speed data transmission may be provided using the 802.11ay wireless interface as a mmWave wireless interface. In this case, the mmWave wireless interface is not limited to the 802.11ay wireless interface, and any wireless interface of a 60 GHz band may be adopted. In relation to this, a 5G or 6G wireless interface using a 28 GHz band or a 60 GHz band may be used for high-speed data transmission between electronic devices.

With respect to an antenna and an RFIC configured to provide a wireless interface in an electronic device such as an image display device, there is a problem in that a specific solution for transmitting an image with a resolution of 4 K or higher is not present. In particular, in consideration of a situation in which an electronic device such as an image display device is arranged on a wall of a building or on a table, wireless AV data may need to be transmitted or received to/from another electronic device. To do so, with respect to regions of arrangement of the antenna and the RFIC in the image display device, a specific configuration and an antenna structure need to be presented.

Figure 5A:
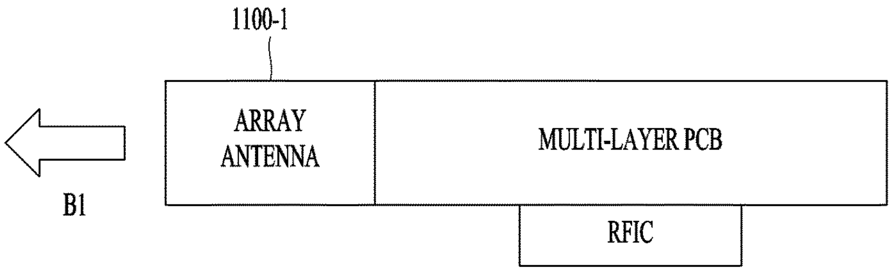
FIG. 5A illustrates a configuration in which a multi-layered circuit substrate on which an array antenna module is arranged is connected to a radio frequency integrated chip (RFIC), in relation to this specification.
Figure 5A:
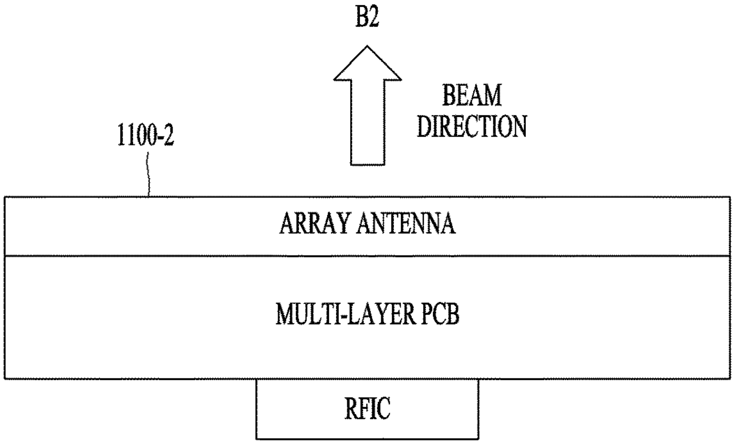

In this regard, FIG. 5A illustrates a configuration in which a multi-layered circuit substrate on which an array antenna module is arranged is connected to an RFIC, in relation to this specification. Specifically, in relation to this specification, a structure of an AIP (antenna in package) module and an antenna module structure implemented on a flexible substrate are illustrated.

Referring to (a) of FIG. 5A, the AIP module is configured as an RFIC-PCB-antenna integrated type for mmWave band communication. In relation to this, an array antenna module 1100-1 may be configured integrally with a multi-layered substrate (a multi-layer PCB) as illustrated in (a) of FIG. 5A. Accordingly, the array antenna module 1100-1 configured integrally with the multi-layered substrate may be referred to as an AIP module. Specifically, the array antenna module 1100-1 may be arranged in one side region of the multi-layered substrate. In relation to this, a first beam B1 may be generated in a side region of the multi-layered substrate using the array antenna module 1100-1 arranged on the one side region of the multi-layered substrate.

On the other hand, referring to (b) of FIG. 5A, an array antenna module 1100-2 may be arranged on the multi-layered substrate. The arrangement of the array antenna module 1100-2 is not limited to the structure of (b) of FIG. 5A, but may be performed on any layer inside the multi-layered substrate. In relation to this, a second beam B2 may be generated toward a front region of the multi-layered substrate using the array antenna module 1100-2 arranged on any layer of the multi-layered substrate. In relation to this, in a case of the AIP module in which an array antenna module is integrally arranged, an array antenna may be arranged on a same PCB to minimize a distance between the RFIC and the antenna.

Meanwhile, the antenna of the AIP module may be implemented using a multi-layer PCB manufacturing process, and radiate a signal in a vertical/side direction of the PCB. In relation to this, double polarization may be implemented using a patch antenna or a dipole/monopole antenna. Accordingly, the first array antenna 1100-1 shown in (a) of FIG. 5A may be arranged on a side region of the multi-layered substrate, and the second array antenna 1100-2 shown in (b) of FIG. 5A may be arranged on a side region of the multi-layered substrate. Therefore, the first beam B1 may be generated through the first array antenna 1100-1, and the second beam B2 may be generated through the second array antenna 1100-2.

The first array antenna 1100-1 and the second array antenna 1100-2 may be configured to have same polarization. Alternatively, the first array antenna 1100-1 and the second array antenna 1100-2 may be configured to have orthogonal polarization. In this regard, the first array antenna 1100-1 may operate as a vertically polarized antenna or operate as a horizontally polarized antenna. For example, the first array antenna 1100-1 may be a monopole antenna having vertical polarization, and the second array antenna may be a patch antenna having horizontal polarization.

Figure 5B:
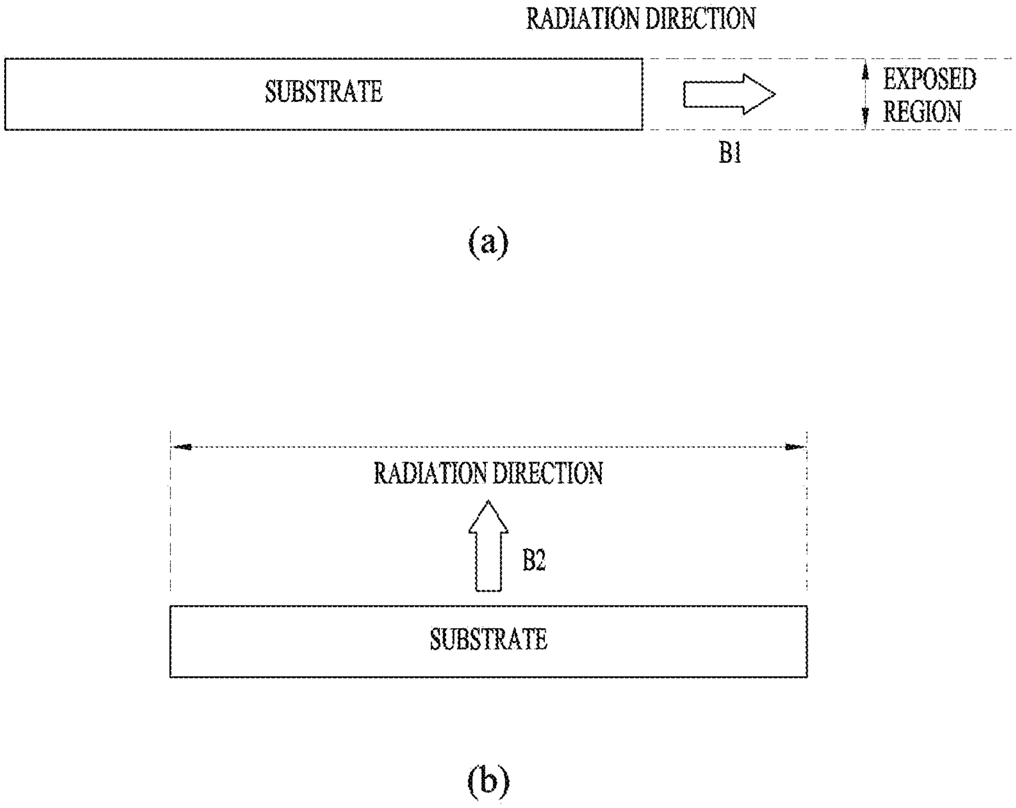
FIG. 5B is a conceptual diagram illustrating antenna structures having different radiation directions.

Meanwhile, FIG. 5B is a conceptual diagram illustrating antenna structures having different radiation directions.

Referring to (a) of FIG. 5A and (a) of FIG. 5B, a radiation direction of an antenna module arranged in the side region of the multi-layered substrate corresponds to a side direction. In relation to this, the antenna implemented on the flexible substrate may be configured as a radiating element such as a dipole/monopole antenna. That is, antennas implemented on the flexible substrate may be end-fire antenna elements.

In relation to this. end-fire radiation may be implemented by an antenna radiating in a direction horizontal to the substrate. Such an end-fire antenna may be implemented as a dipole/monopole antenna, a Yagi-dipole antenna, a Vivaldi antenna, a substrate integrated waveguide (SIW) horn antenna, or the like. In relation to this, the Yagi-dipole antenna and the Vivaldi antenna have horizontal polarization characteristics. One of the antenna modules arranged in the image display device described herein needs a vertical polarization antenna. Accordingly, there is a need to present an antenna structure capable of minimizing an antenna exposure area while operating as a vertical polarization antenna.

Referring to (b) of FIG. 5A and (a) of FIG. 5B, a radiation direction of the antenna module arranged on a front region of the multi-layered substrate corresponds to a front direction. In relation to this, an antenna arranged in the AIP module may be configured as a radiating element such as a patch antenna. That is, antennas arranged in the AIP module may be broadside antenna elements radiating in the broadside direction.

Figure 5C:
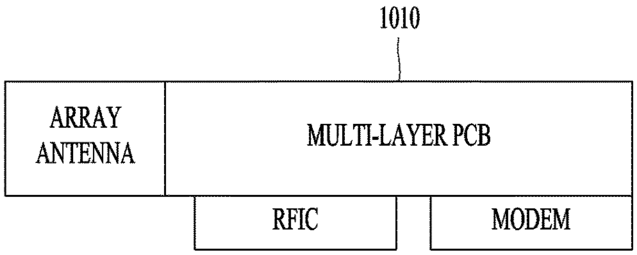
FIG. 5C illustrates a combination structure between a multi-layered substrate and a main substrate according to embodiments.
Figure 5C:
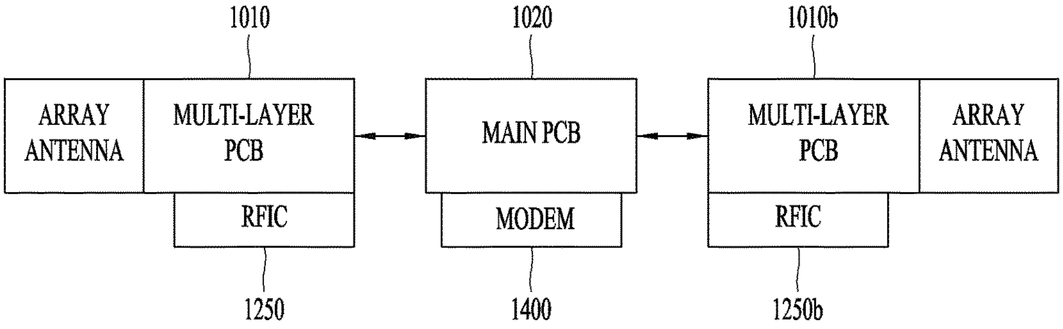

The multi-layered substrate having the array antenna arranged inside may be arranged integrally with the main substrate or may be configured to be combined with the main substrate as a modular type by a connector. In relation to this, FIG. 5C illustrates a combination structure between a multi-layered substrate and a main substrate according to embodiments. Referring to (a) of FIG. 5C, a structure in which an RFIC 1250 and a modem 1400 are integrally arranged on a multi-layered substrate 1010 is shown. The modem 1400 may be referred to as the baseband processor 1400. Accordingly, the multi-layered substrate 1010 is integrally provided integrally with the main substrate. Such an integrated structure may be applied to a structure in which only one array antenna module is arranged in the electronic device.

On the other hand, the multi-layered substrate 1010 and the main substrate 10120 may be configured to be combined with each other as a modular type by a connector. Referring to (b) of FIG. 5C, in relation to this, the multi-layered substrate 1010 may be configured to interface with the main substrate 1020 through a connector. In this case, the RFIC 1250 may be arranged on the multi-layered substrate 1010, and the modem 1400 may be arranged on the main substrate 1020. Accordingly, the multi-layered substrate 1010 may be configured as a substrate separate from the main substrate 1020 and configured to be combined with the main substrate 1020 through a connector.

Such a modular structure may be applied to a structure in which a plurality of array antenna modules are arranged in the electronic device. Referring to (b) of FIG. 5C, the multi-layered substrate 1010 and a second multi-layered substrate 1020 may be configured to interface with the main substrate 1020 through connector connection. The modem 1400 arranged on the main substrate 1020 may be electrically coupled to RFICs 1250 and 1250*b* arranged on the multi-layer PCB 1010 and the second multi-layer PCB 1020, respectively.

Figure 6:
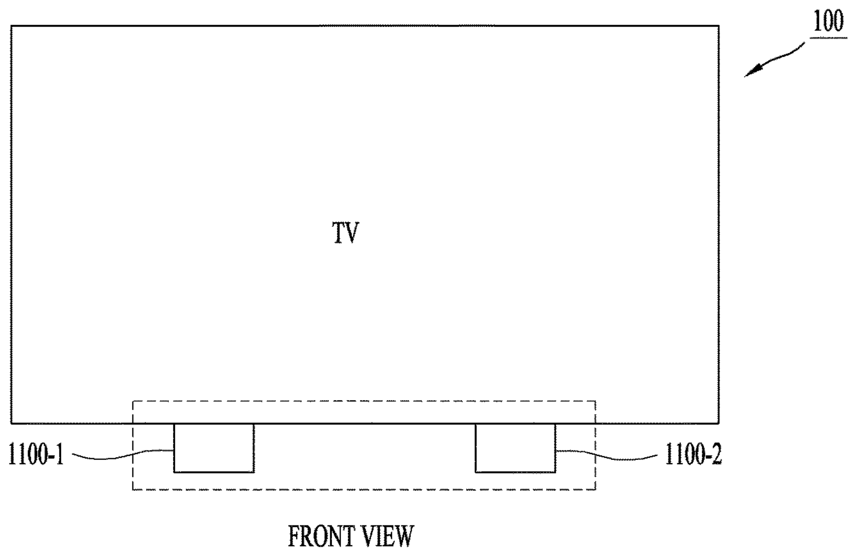
FIG. 6 is a conceptual diagram illustrating a plurality of communication modules arranged on a lower portion of an image display device, a configuration of the communication modules, and communication between the communication modules and other communication modules arranged in a front direction.
Figure 6:
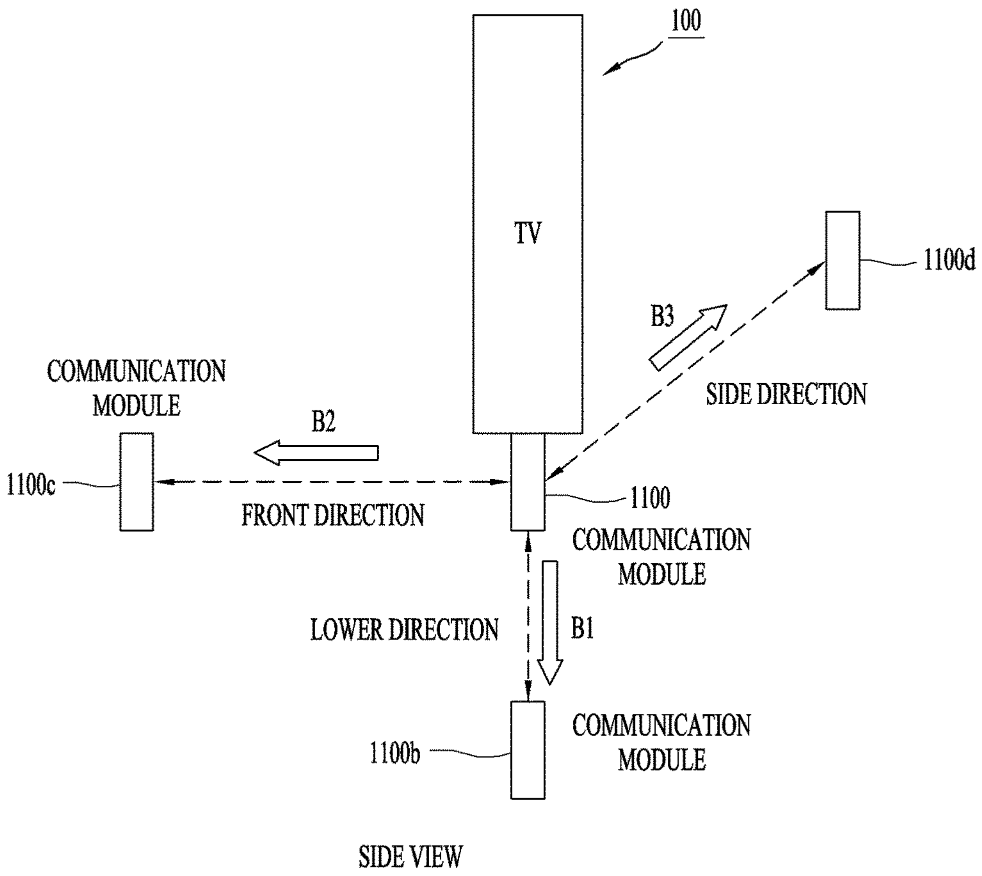

Meanwhile, when the AIP module is arranged on a lower portion of the electronic device such as an image display device, communication needs to be performed with other communication modules arranged in a lower direction and a front direction. In relation to this, FIG. 6 is a conceptual diagram illustrating a plurality of communication modules arranged on a lower portion of an image display device, a configuration of the communication modules, and communication between the communication modules and other communication modules arranged in a front direction. Referring to (a) of FIG. 6, different communication modules 1100-1 and 1100-2 may be arranged on a lower portion of the image display device 100. Referring to (b) of FIG. 6, the image display device 100 may perform communication with a communication module 1100*b* arranged therebelow through the antenna module 1100. In addition, communication may be performed with the second communication module 1100*c* arranged in front of the image display device 100 through the antenna module 1100 of the image display device 100. In relation to this, the communication module 1100*b* may be a set-top box or an access point (AP) that transmits AV data to the image display device 100 through an 802.11ay wireless interface at a high speed, but is limited thereto. The second communication module 1100*c* may be any electronic device that transceives data to/from the image display device 100 at a high speed through the 802.11ay wireless interface.

In the AIP module structure as illustrated in (a) of FIG. 5A, an antenna height may increase depending on an RFIC driving circuit and a heat dissipation structure. Also, depending on a type of an antenna that is being used, an antenna height may increase in the AIP module structure as shown in (a) of FIG. 5A. On the other hand, in the antenna module structure implemented in a side region of the multi-layered substrate as illustrated in (b) of FIG. 5A, an antenna may be implemented in a low-profile shape.

Meanwhile, a detailed configuration of the antenna modules of FIGS. 5A to 5C, which may be arranged inside or on a side surface of the electronic device of FIGS. 4 and 6, in the electronic device of FIGS. 1 to 2 and the configurations of FIGS. 3A and 3B, is to be described.

A communication module including an antenna may be arranged so that an electronic device such as an image display device may perform communication with a neighboring electronic device. Recently, as a display area of an image display device is enlarged, an arrangement space of a communication module including an antenna is reduced.

Accordingly, there is an increasing need to arrange an antenna in a multi-layered circuit substrate on which a communication module is implemented.

Meanwhile, a WiFi wireless interface may be taken into account, as an interface for a communication service between electronic devices. When such a WiFi wireless interface is used, a millimeter wave (mmWave) band may be used for high-speed data transmission between electronic devices. In particular, high-speed data transmission between electronic devices may be performed using a wireless interface such as an 802.11ay wireless interface.

In relation to this, an array antenna capable of operating in a mmWave band may be mounted in an antenna module. However, electronic components such as an antenna and a transceiver circuit arranged in such an antenna module are configured to be electrically connected to each other. To do so, the transceiver circuit may be operably coupled to the antenna module, and the antenna module may be configured as a multi-layered substrate.

Antenna elements of the antenna module in a form of the multi-layered substrate may radiate a wireless signal in one side direction of the antenna module. However, there is such a problem that antenna performance significantly deteriorates when the antenna module is placed in an electronic device implemented to have a side region with a metal frame. In particular, there is such a problem that radio waves of an antenna are not radiated sufficiently toward a side region due to a large metal frame such as a display in an upper region, but are reflected and directed toward a lower region. Accordingly, it is difficult for an electronic device to perform high-speed wireless communication with other electronic devices located in the side region.

An object of this specification to solve the above-mentioned problems is to provide an electronic device having an antenna module that operates in a millimeter wave band and a metal frame arranged therein. Another object of this specification is to solve such a problem that an antenna that radiates a radio wave toward a side surface cannot properly radiate a radio wave toward the side surface due to a metal frame. Another object of this specification is to improve radiation performance in a side direction by optimizing a shape of a dielectric case arranged below a metal frame. Another object of this specification is to perform wireless communication with various peripheral electronic devices in several directions by arranging antenna modules in difference positions below an electronic device. Another object of this specification is to perform wireless communication with various peripheral electronic devices in several directions by arranging antenna modules in difference positions below an electronic device.

Figure 7A:
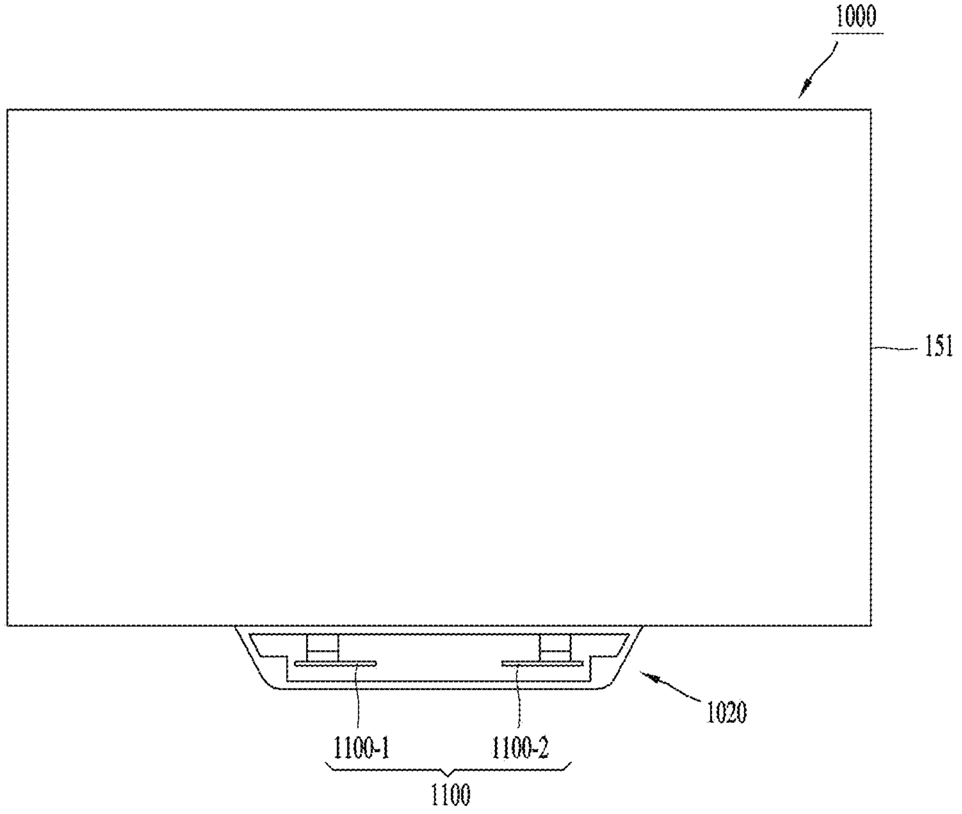
FIG. 7A illustrates a structure of an antenna module arranged in a dielectric case placed on a lower region of a metal frame of an electronic device.

Hereinafter, an antenna module that operates in a millimeter wave band according to this specification, and an electronic device including the antenna module are to be described. In this regard, FIG. 7A illustrates a structure of an antenna module arranged in a dielectric case placed on a lower region of a metal frame of an electronic device. Meanwhile, FIG. 7B is an enlarged view of the antenna module arranged in the dielectric case of FIG. 7A.

Figure 7B:
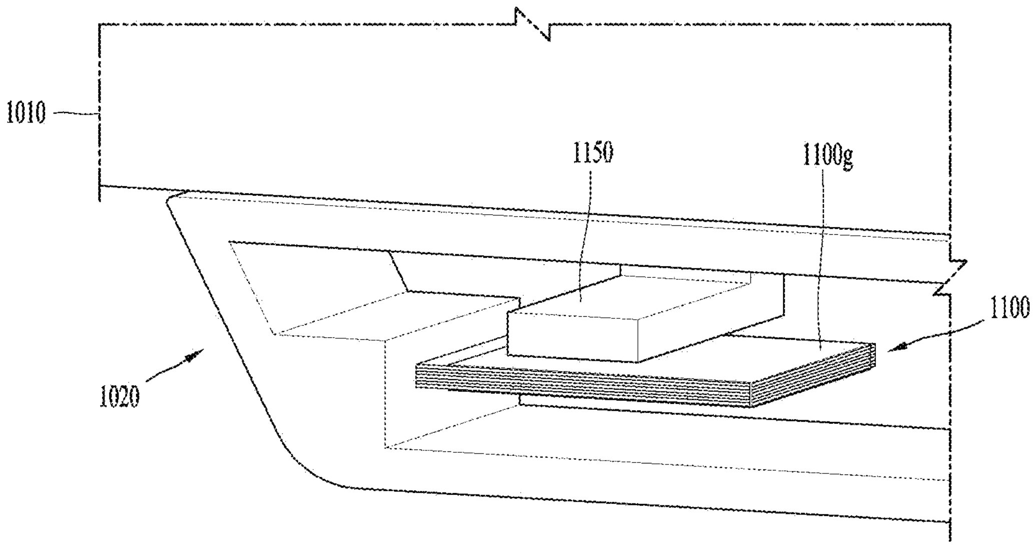
FIG. 7B is an enlarged view of the antenna module arranged in the dielectric case of FIG. 7A.

Referring to FIGS. 7A and 7B, a dielectric case 1020 may be arranged on a lower region of the electronic device 1000. The antenna modules 1100-1 and 1100-2 may be placed inside the dielectric case 1020, respectively. A combining structure may be placed in a ground region 1100*g* of the antenna module 1100. The combining structure may be coupled to a metal frame 1010 in an upper portion of the dielectric case 1020. An example of the coupling structure may be a metal case 1150. The metal case 1150 may arranged to be apart from an antenna element placed in a dielectric region of the antenna module 1100 by a predetermined gap.

Figure 8A:
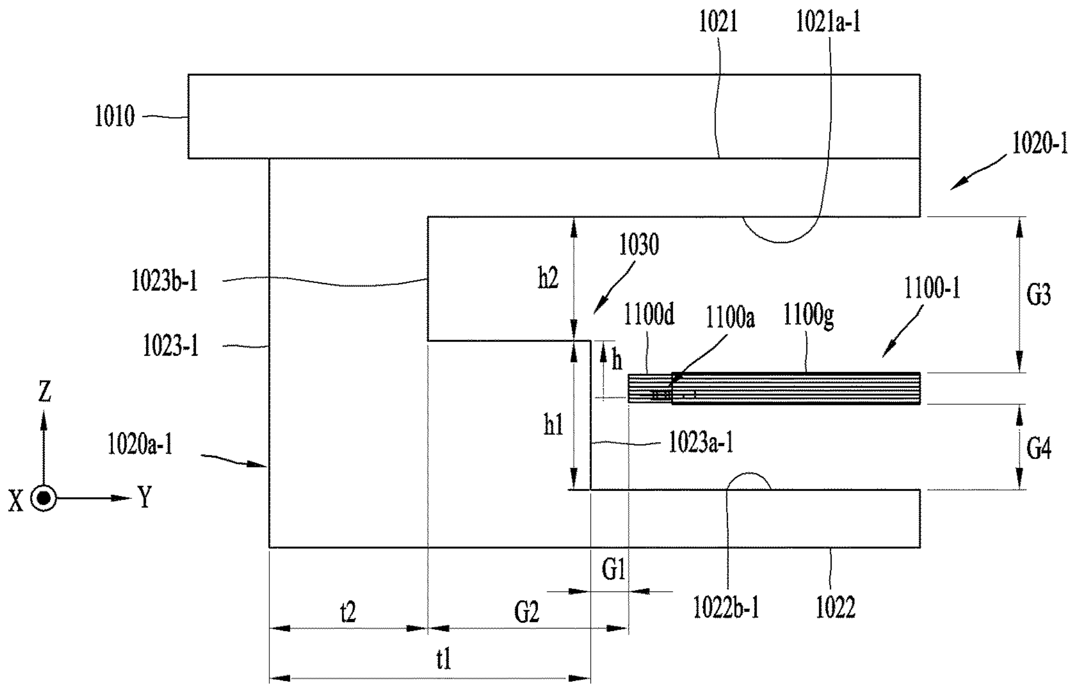
FIGS. 8A and 8B illustrate structures in which an antenna module is arranged in a dielectric case having an inner surface with varying thicknesses and an outer surface arranged vertically, respectively.
Figure 8B:
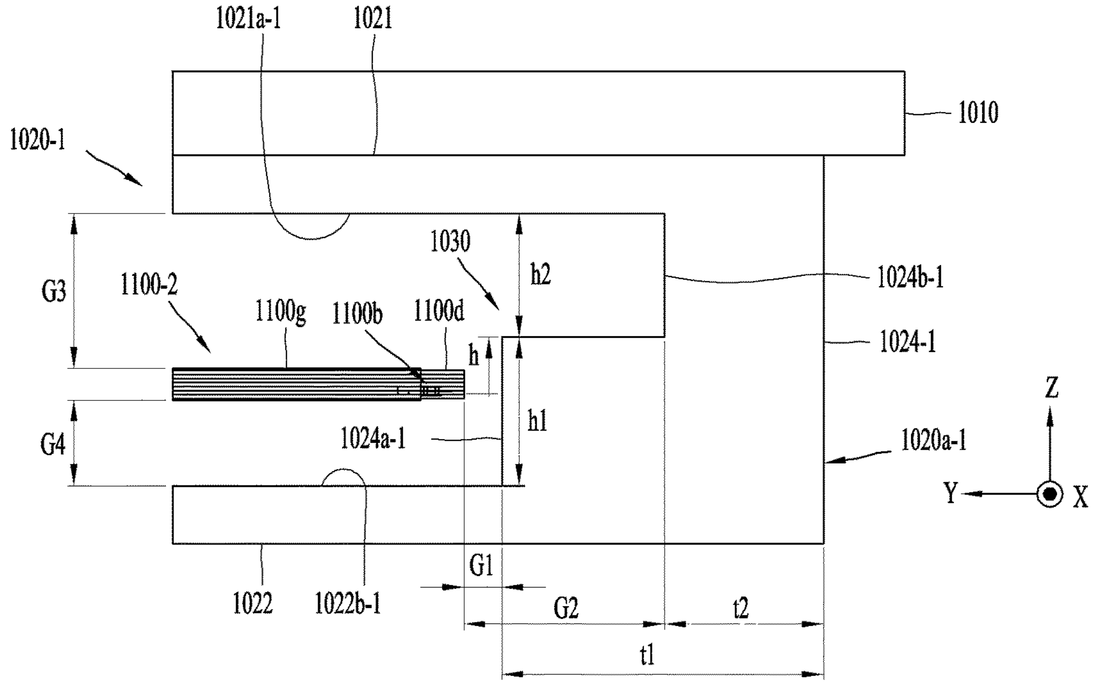
Figure 8C:
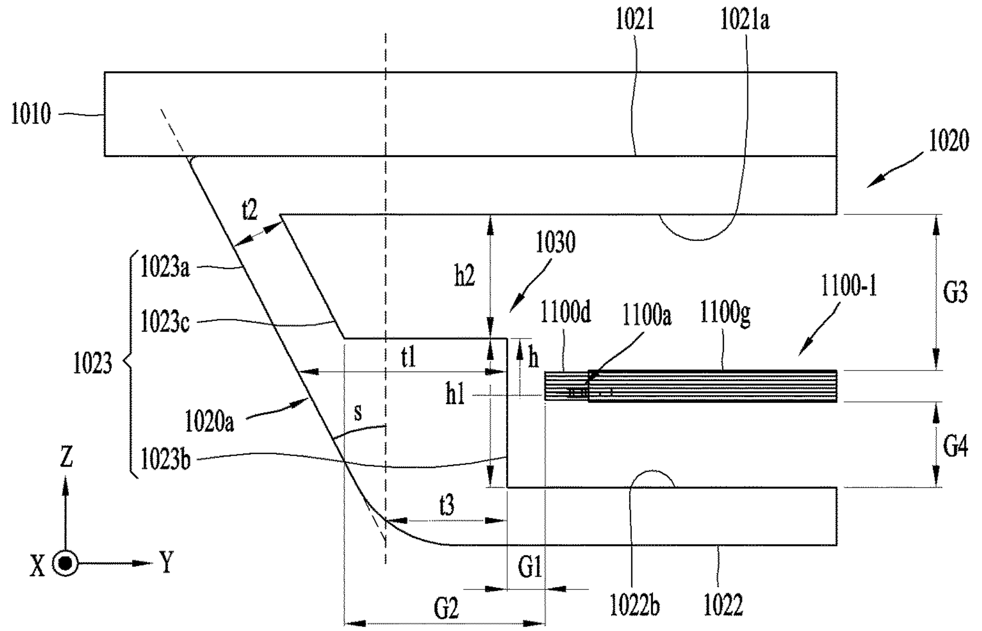
FIGS. 8C and 8D illustrate structures in which an antenna module is arranged in a dielectric case having an inner surface with varying thicknesses and an outer surface arranged slantedly, respectively.
Figure 8D:
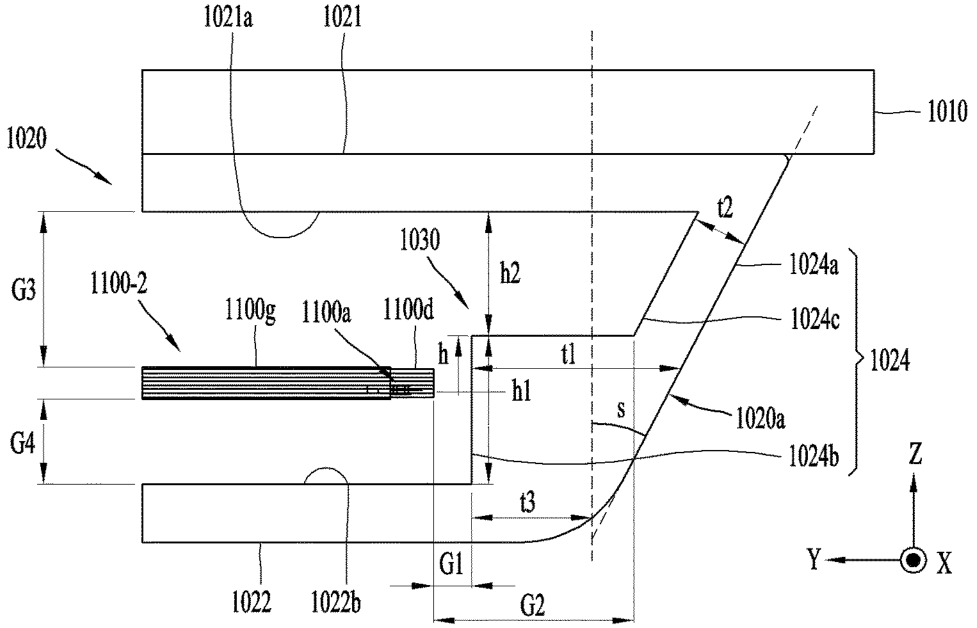

Meanwhile, in the electronic device according to this specification, a dielectric case in which an antenna module is placed may be slantedly arranged at a predetermined angle with respect to a vertical axis. In this regard, FIGS. 8A and 8B illustrate structures in which an antenna module is arranged in a dielectric case having an inner surface with varying thicknesses and an outer surface arranged vertically, respectively. FIGS. 8C and 8D illustrate structures in which an antenna module is arranged in a dielectric case having an inner surface with varying thicknesses and an outer surface arranged slantedly, respectively.

Referring to FIG. 8A, the antenna module 1100-1 may be arranged on one side of the dielectric case 1020 placed on a lower region of the metal frame 1010. An array antenna 1100*a* of the antenna module 1100-1 may radiate a wireless signal through inner surfaces 1023*a*-1 and 1023*b*-1 and an outer surface 1023-1 of a dielectric case 1020-1. Referring to FIG. 8B, an antenna module 1100-2 may be placed on another side of the dielectric case 1020-1 placed on a lower region of the metal frame 1010. An array antenna 1100*b* of the antenna module 1100-2 may radiate a wireless signal through inner surfaces 1024*a*-1 and 1024*b*-2 and an outer surface 1024-1 of the dielectric case 1020.

Referring to FIG. 8C, the antenna module 1100-1 may be arranged on one side of the dielectric case 1020 placed on a lower region of the metal frame 1010. The array antenna 1100*a* of the antenna module 1100-1 may radiate a wireless signal through first inner surface 1023*b* and an outer surface 1023*a* of the dielectric case 1020. Referring to FIG. 8D, the antenna module 1100-2 may be placed on another side of the dielectric case 1020 placed on a lower region of the metal frame 1010. The array antenna 1100*b* of the antenna module 1100-2 may radiate a wireless signal through first inner surface 1023*b* and an outer surface 1024*a* of the dielectric case 1020.

Figure 9:
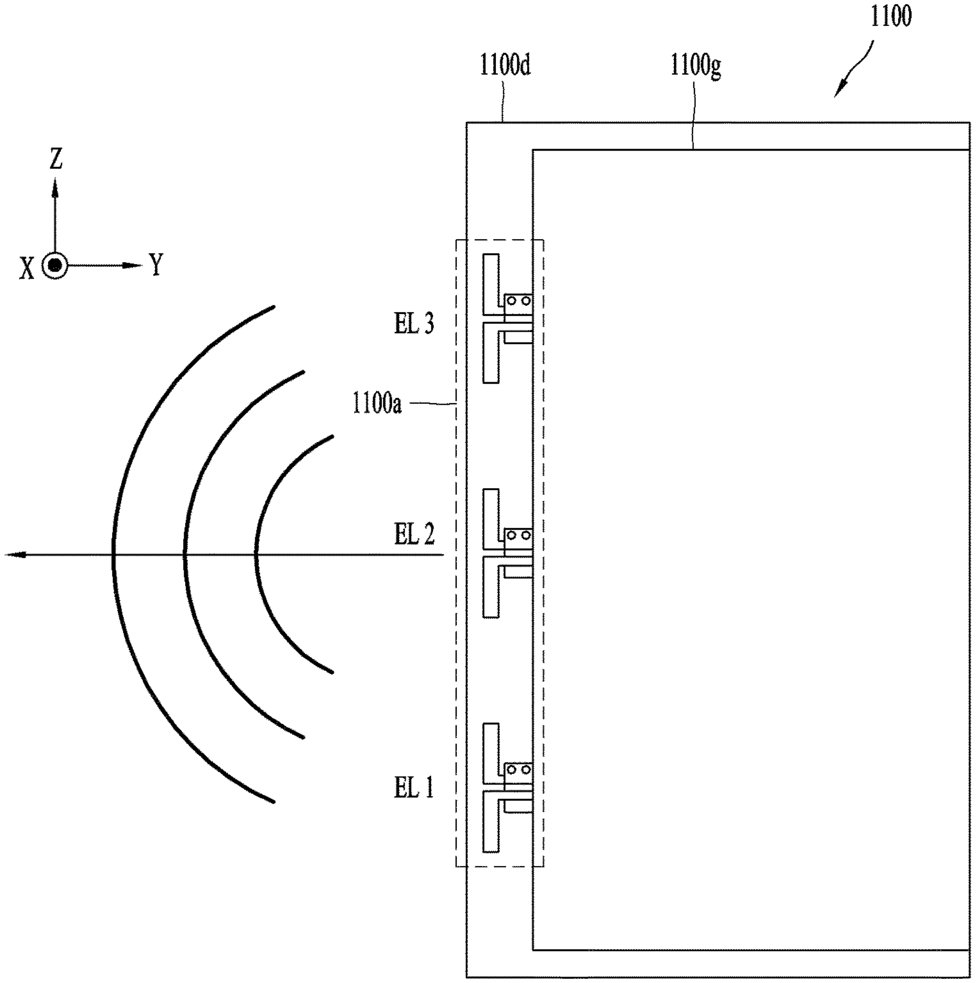
FIG. 9 illustrates an array antenna structure in which a plurality of antenna elements are arranged in the antenna modules of FIGS. 8A to 8D.

FIG. 9 illustrates an array antenna structure in which a plurality of antenna elements are arranged in the antenna modules of FIGS. 8A to 8D. Referring to FIG. 9, the array antenna 1100*a* may include a plurality of antenna elements EL1, EL2, and EL3 spaced apart from each other by a predetermined gap in an x-axial direction, i.e., a first axial direction. The array antenna 1100*a* is illustrated as a 1×3 array antenna having three antenna elements, but is not limited thereto.

Referring to FIGS. 8A to 9, the array antenna 1100*a* may be configured as a multi-layered substrate including a plurality of dielectric layers and a plurality of conductive layers. The array antenna 1100*a* may be implemented as an end-fire antenna that radiates a wireless signal in a side direction of the multi-layered substrate. For example, the array antenna 1100*a* may be a 1×3 dipole antenna placed at an end of a PCB implemented as a multi-layered substrate. The PCB implemented as a multi-layered substrate may constitute the antenna module 1100. The PCB implemented as the antenna module 1100 may include a dielectric region 1100*d* in which antenna elements are arranged and the ground region 1100*g* adjacent to the dielectric region 1100*d*. The array antenna 1100*a* may be placed in the dielectric region 1100*d*. Radiators constituting the array antenna 1100*a* are arranged in the dielectric region 1100*d*, and a ground structure of the ground region 1100*g* of the PCB may be used as a reflector to radiate an electromagnetic wave in a side direction of the antenna module 1100.

Referring to FIGS. 7A to 9, the electronic device 1000 having an antenna module may be configured to include the dielectric case 1020, the array antenna 1100*a*, and an air material 1030. The electronic device may be configured to further include the frame 1010 and a display 151. The air material 1030 may be arranged to have a predetermined height and may therefore be referred to as an air layer.

The frame 1010 may be configured to constitute a side region of the electronic device 1000. The frame 1010 may be placed to surround the display 151 and configured to support the display 151. The frame 1010 may be configured as a metal frame made of metal material, but is not limited thereto. The dielectric case 1020 may be located on one side of the metal frame 1010. For example, the dielectric case 1020 may be placed on one side constituting a lower region of the metal frame 1010.

The array antennas 1100*a* and 1100*b* may be each arranged inside a substrate placed in an inner region of the dielectric case 1020. The array antenna 1100*a* may be placed to face an inner surface of the dielectric case 1020. The air material 1030 may be positioned between the dielectric case 1020 and the metal frame 1010. The air material 1030 may be included inside the dielectric case 1020. The air material 1030 may be an inner region of the dielectric case 1020 which is placed on the lower region of the metal frame 1010.

The dielectric cases 1020-1 and 1020 may be each configured to include a plurality of side parts (side surface portions). The dielectric case 1020-1 may be configured to include a first side part 1021, a second side part 1022, a third side part 1023-1 or 1023, and a fourth side part 1024-1 or 1024. The first side part 1021 may be arranged to be attached to the metal frame 1010. The second side part 1022 may be arranged to correspond to the first side part 1021. The third side parts 1023-1 and 1023 and the fourth side parts 1024-1 and 1024 may be each arranged between the first side part 1021 and the second side part 1022. The first side part 1021 and the second side part 1022 may be referred to as a front surface portion 1021 and a rear surface portion 1022, respectively. The third side parts 1023-1 and 1023 and the fourth side parts 1024-1 and 1024 may be referred to as one side parts 1023-1 and 1023 and another side parts 1024-1 and 1024, respectively.

The front surface portion 1021 of each of the dielectric cases 1020-1 and 1020 may be configured to be attached to the metal frame 1010. The rear surface portion 1022 of the dielectric case 1020 may be arranged to correspond to the front surface portion 1021 of the dielectric case 1020. The side parts 1023 and 1024 of the dielectric case 1020 may be each arranged between the front surface portion 1021 and the rear surface portion 1022 of the dielectric cases 1020-11020. The side part 1023 of each of the dielectric cases 1020-1 and 1020 may be placed to connect one end of the front surface portion 1021 and one end of the rear surface portion 1022 of the dielectric case 1020. The side part 1024 of each of the dielectric cases 1020-1 and 1020 may be arranged to connect another end of the front surface portion 1021 and another end of the rear surface portion 1022 of the dielectric case 1020.

Referring to FIGS. 7A to 8B and FIG. 9, electronic devices in which the array antennas 1100*a* and 1100*b* are arranged, respectively, in the dielectric case 1020-1 having an inner surface with varying thicknesses and an outer surface arranged vertically are described.

The side parts of the dielectric case 1020-1 may include inner surfaces and an outer surface corresponding to the inner surfaces. The inner surfaces may include a first inner surface 1023*a*-1 or 1024*a*-1 and a second inner surface 1023*b*-1 or 1024*b*-1. The first inner surface 1023*a*-1 or 1024*a*-1 may be arranged to face and be spaced apart, by a first gap G1, from a surface vertical to a longitudinal end of the array antenna 1100*a* or 1100*b* and one among the third or fourth side part 1023-1 or 1024-1 of the dielectric case 1020-1. The second inner surface 1023*b*-1 or 1024*b*-1 may be arranged to face and be spaced apart, by a second gap G2, from a surface vertical to a longitudinal of the array antenna 1100*a* or 1100*b* and one among the third or fourth side part 1023-1 or 1024-1 of the dielectric case 1020-1. A region of the second inner surface 1023*b*-1 or 1024*b*-1 may be arranged between the first inner surface 1023*a*-1 and 1024*a*-1 and the metal frame 1010.

The second gap G2 may be arranged more widely than the first gap G1. A first thickness t1 between the first inner surface 1023*a*-1 or 1024*a*-1 and the outer surface 1023-1 or 1024-1 may be configured to be greater than a second thickness t2 between the second inner surface 1023*b*-1 or 1024*b*-1 and the outer surface 1023-1 or 1024-1. The array antenna 1100*a* or 1100*b* may be configured to radiate a wireless signal through the inner surfaces 1023*a*-1 and 1023*b*-1 or 1024*a*-1 and 1024*b*-1 and the outer surface 1023-1 or 1024-1 of the dielectric case 1020-1.

The first inner surfaces 1023*a*-1 and 1024*a*-1 may each further include an inner surface 1022*b*-1 in a lower region of the dielectric case 1020-1. The second inner surfaces 1023*b*-1 and 1024*b*-1 may each further include an inner surface 1021*a*-1 in an upper region of the dielectric case 1020-1. Each of the array antennas 1100*a* and 1100*b* may be spaced apart from the second inner surface 1021*a*-1 of the dielectric case 1020-1 by a third gap G3. The array antennas 1100*a* and 1100*b* may be each spaced apart from the first inner surface 1022*b*-1 of the dielectric case 1020-1 by a fourth gap G4. The third gap G3 may be configured to be wider than the fourth gap G4.

The array antenna 1100*a* or 1100*b* may be arranged nearer a region of the first inner surface 1023*a*-1 or 1024*a*-1 than a region of the second inner surface 1023*b*-1 or 1024*b*-1 of the dielectric case 1020-1. The array antennas 1100*a* and 1100*b* may be each arranged nearer a region of the first inner surface 1022*b*-1 than a region of the second inner surface 1021*a*-1 of the dielectric case 1020-1. Accordingly, the array antennas 1100*a* and 1100*b* may each mainly radiate a wireless signal through one side surface, another side surface, and a lower region.

A connecting portion 1150 electrically connected to the metal frame 1010 may be further arranged in the ground region 1100*g* placed inside the substrate. The connecting portion 1150 connected to the metal frame 1010 may be the metal case 1150 made of a metal material, but is not limited thereto.

A substrate on which the array antenna 1100*a* or 1100*b* is arranged may be configured as a multi-layered substrate. Antenna elements of the array antennas 1100*a* and 1100*b* may be arranged on a particular layer of the multi-layered substrate. The antenna elements may be configured to radiate a beamformed wireless signal through one side surface of the multi-layered substrate, and the first inner surfaces 1023*a*-1 and 1024*a*-1 and the outer surfaces 1023-1 and 1024-1 of the dielectric case 1020-1.

The antenna elements may constitute a 1×N array antenna in which the antenna elements are spaced apart from each other on a particular layer of a multi-layered substrate in one axial direction by a predetermined gap. The antenna elements may be configured as end-fire radiators that radiate wireless signals through one side surface of the multi-layered substrate. The 1×N array antennas 1100*a* and 1100*b* may each generate a first radiation pattern having a first beam width in one axial direction. The 1×N array antennas 1100*a* and 1100*b* may each generate a second radiation pattern having a second beam width within a predetermined angular range in a lower direction of the metal case 1010. The second beam width may be configured to be wider than the first beam width.

Referring to FIGS. 7A, 7B, and 8C to 9, electronic devices in which the array antenna 1100*a* are 1100*b* are arranged, respectively, in the dielectric case 1020 having an inner surface with varying thicknesses and the outer surface arranged slantedly are described.

The dielectric case 1020 may be configured to include a plurality of side parts (side surface portions). The dielectric case 1020 may be configured to include the first side part 1021, the second side part 1022, the third side part 1023, and the fourth side part 1024. The first side part 1021 may be arranged to be attached to the metal frame 1010. The second side part 1022 may be arranged to correspond to the first side part 1021. The third side part 1023 and the fourth side part 1024 may be each arranged between the first side part 1021 and the second side part 1022. The first side part 1021 and the second side part 1022 may be referred to as the front surface portion 1021 and the rear surface portion 1022, respectively. The third side part 1023 and the fourth side part 1024 may be referred to as one side part 1023 and another side part 1024, respectively.

The third side part 1023 and the fourth side part 1024 may be slantedly arranged. Accordingly, a length of the first side part 1021 may be configured to be greater than a length of the second side part 1021. The outer surfaces 1023*a* and 1024*a* of the dielectric case 1020 may be each slantedly arranged at an angle of 15 to 45 degrees with respect to a vertical axis, thereby optimizing a direction and a size of a radiated signal. The outer surfaces 1023*a* and 1024*a* of the dielectric case 1020 may be each slantedly arranged at an angle of 60 degrees or less with respect to a vertical axis, thereby optimizing a direction and a size of a radiated signal.

The side parts of the dielectric case 1020 may include inner surfaces and an outer surface corresponding to the inner surfaces. The outer surfaces 1023*a* and 1024*a* may be slantedly arranged with respect to a vertical axis. The inner surfaces may include the first inner surface 1023*b* or 1024*b* and the second inner surface 1023*c* or 1024*c*. The first inner surface 1023*b* or 1024*b* may be arranged to face and be spaced to be apart, by a first gap G1, from a surface vertical to a longitudinal end of the array antenna 1100*a* or 1100*b* and one among the third or fourth side part 1023 or 1024 of the dielectric case 1020-1. The second inner surface 1023*c* or 1024*c* may be arranged to face and spaced apart, by a plurality of second gaps G2, from one surface among a vertical surface at an end of the array antenna 1100*a* or 1100*b* and one surface among the third or fourth side part 1023-1 or 1024-1 of the dielectric case 1020-1. A region of the second inner surface 1023*c* or 1024*c* may be arranged between the first inner surface 1023*b* or 1024*b* and the metal frame 1010.

The plurality of second gaps G2 may be arranged more widely than the first gap G1. The first thickness t1 between the first inner surface 1023*b* or 1024*b* and the outer surface 1023*a* or 1024*a* may be configured to be greater than the second thickness t2 between the second inner surface 1023*c* or 1024*c* and the outer surface 1023*a* or 1024*a*. The array antennas 1100*a* or 1100*b* may be configured to radiate a wireless signal through the outer surface 1023*a* or 1024*a* slantedly arranged with respect to the inner surfaces 1023*b* and 1023*c* or the inner surfaces 1024*b* and 1024*c* of the dielectric case 1020-1.

The first inner surfaces 1023*b* and 1024*b* may each further include an inner surface 1022*b* in a lower region of the dielectric case 1020-1. The second inner surfaces 1023*c* and 1024*c* may each further include an inner surface 1021*a* in an upper region of the dielectric case 1020-1. The array antennas 1100*a* and 1100*b* may be each spaced apart from the second inner surface 1021*a* of the dielectric case 1020-1 by the third gap G3. The array antennas 1100*a* and 1100*b* may be each spaced apart from the first inner surface 1022*b* of the dielectric case 1020-1 by the fourth gap G4. The third gap G3 may be configured to be wider than the fourth gap G4.

The array antenna 1100*a* or 1100*b* may be arranged nearer a region of the first inner surface 1023*b* or 1024*b* than a region of the second inner surface 1023*c* or 1024*c* of the dielectric case 1020. The array antenna 1100*a* or 1100*b* may be arranged nearer a region of the first inner surface 1022*b* than a region of the second inner surface 1021*a* of the dielectric case 1020. Accordingly, the array antennas 1100*a* and 1100*b* may each mainly radiate a wireless signal through one side surface and another side surface and a lower region.

A connecting portion 1150 electrically connected to the metal frame 1010 may be further arranged in the ground region 1100*g* placed inside the substrate. The connecting portion 1150 connected to the metal frame 1010 may be the metal case 1150 made of a metal material, but is not limited thereto.

A substrate on which the array antenna 1100*a* or 1100*b* is arranged may be configured as a multi-layered substrate. Antenna elements of the array antennas 1100*a* and 1100*b* may be arranged on a particular layer of the multi-layered substrate. The antenna elements may be configured to radiate a beamformed wireless signal through one side surface of the multi-layered substrate, and the first inner surfaces 1023*b* and 1024*b* and the outer surfaces 1023*a* and 1024*a* of the dielectric case 1020.

The antenna elements may constitute a 1×N array antenna in which the antenna elements are spaced apart from each other on a particular layer of a multi-layered substrate in one axial direction by a predetermined gap. The antenna elements may be configured as end-fire radiators that radiate wireless signals through one side surface of the multi-layered substrate. The 1×N array antennas 1100*a* and 1100*b* may each generate a first radiation pattern having a first beam width in one axial direction. The 1×N array antennas 1100*a* and 1100*b* may each generate a second radiation pattern having a second beam width within a predetermined angular range in a lower direction of the metal case 1010. The second beam width may be configured to be wider than the first beam width.

Figure 10:
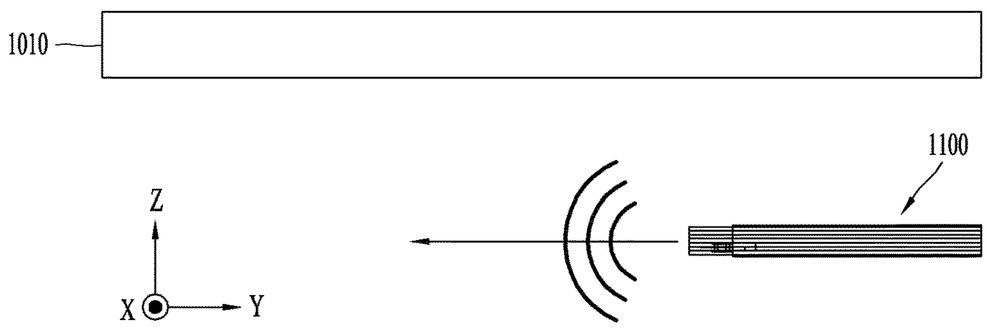
FIG. 10 illustrates a structure in which an antenna module is arranged inside a dielectric case arranged vertically according to an embodiment.
Figure 10:
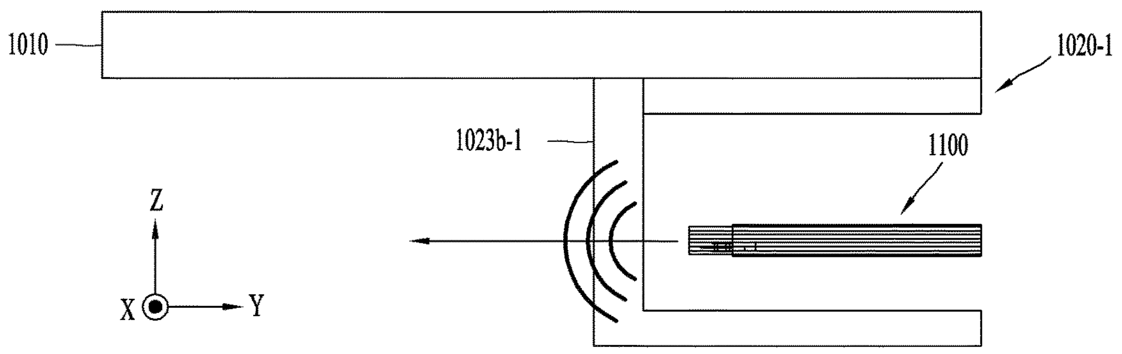

Meanwhile, according to another embodiment of this specification, an outer surface of a dielectric case attached to the frame 1010 may be arranged vertically. In this regard, FIG. 10 illustrates a structure in which an antenna module is arranged inside a dielectric case arranged vertically according to an embodiment. (a) of FIG. 10 shows a structure in which the antenna module 1100 is arranged in a region below the metal frame 1010 to radiate a wireless signal in a side direction. (b) of FIG. 10 shows the dielectric case 1020-1 having an outer surface 1023*b*-1 arranged vertically in a region below the metal frame 1010. Referring to (b) of FIG. 10, the antenna module 1100 radiates a wireless signal through the dielectric case 1020-1 in which the outer surface 1023*b*-1 is arranged vertically.

Referring to FIG. 10, the antenna module 1100 is arranged horizontally in a region below the metal frame 1010. The metal frame 1010 may have a structure that supports or a display or a portion of a display of an electronic device such as an image display device. The metal frame 1010 made of a metal material may obstruct a path of electromagnetic waves radiating in a side direction through the antenna module 1100.

Referring to (b) of FIG. 10, the antenna module 1100 may be arranged in an inner region of the dielectric case 1020-1 placed on a lower region of the metal frame 1010. Referring to FIGS. 7, 8, and 10, the dielectric cases 1020 and 1020-1 may be made of a dielectric material such as plastic having a predetermined permittivity. The dielectric cases 1020 and 1020-1 may be each configured to have a permittivity of about 2.5, but are not limited thereto and may be changed depending on an application.

In a structure in which the metal frame 1010 is arranged in a region above the antenna module 1100 as shown in (a) of FIG. 10, distortion may occur in a radiation pattern. In a structure in which the outer surface 1023*a* of the dielectric case 1020-1 placed on a lower region of the metal frame 1010 is arranged vertically, as shown in (b) of FIG. 10, distortion may also occur in a radiation pattern.

Figure 11:
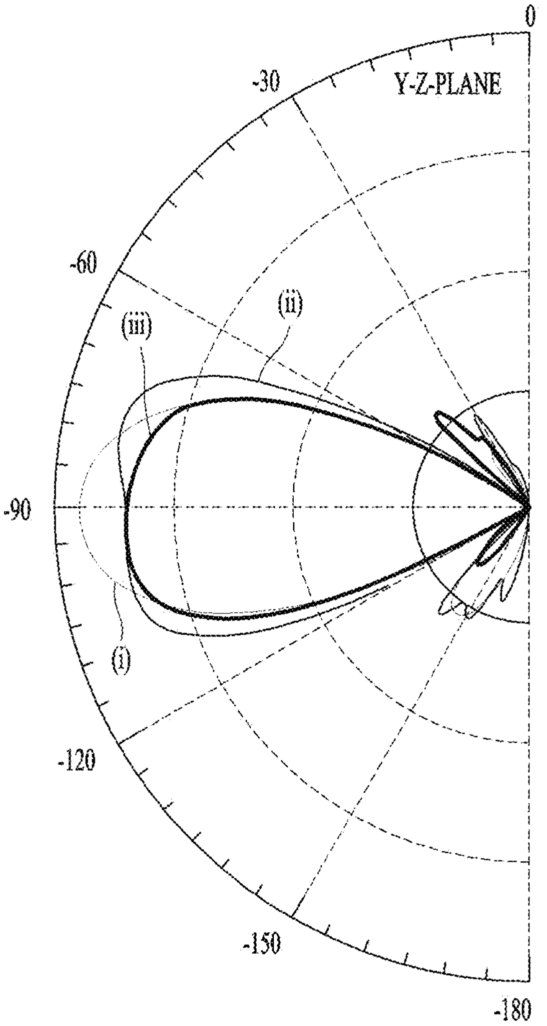
FIG. 11 shows a comparison between horizontal radiation patterns in a structure in which only an antenna module is arranged without a metal frame, a structure in which an antenna module is placed in a region below a metal frame, and a structure in which an antenna module is arranged inside a dielectric case.

In this regard, FIG. 11 shows a comparison between horizontal radiation patterns in a structure in which only an antenna module is arranged without a metal frame, a structure in which an antenna module is placed in a region below a metal frame, and a structure in which an antenna module is arranged inside a dielectric case. A horizontal radiation pattern represents a two-dimensional (2D) radiation pattern on an x-y plane.

Referring to FIG. 11, (i) a first radiation pattern of a first structure in which only an antenna module is arranged is generated in a symmetrical shape in a side direction without distortion. Meanwhile, (ii) a second radiation pattern of a second structure in which an antenna module is arranged in a region below a metal frame is distorted in a left-right asymmetric form with respect to a side direction. An antenna gain value of the second structure is also reduced by about 2 dB compared to an antenna gain value of the first structure. In addition, (iii) a third radiation pattern of a third structure in which an antenna module is arranged inside a dielectric case having an outer surface arranged vertically is distorted in a left-right asymmetric form with respect to a side direction. A degree of the distortion of the third radiation pattern is greater than that of the second radiation pattern. Thus, radiation pattern quality deteriorates. Referring to FIGS. 10 and 11, it may be checked that even when a dielectric case 10201-1 having the outer surface 1023*b*-1 arranged vertically is placed on a lower region of the metal frame 1010, an antenna gain may not be improved in a side direction.

Accordingly, referring to FIGS. 7A to 9, the outer surface 1023*b* or 1024*b* of the side part 1023 or 1024 of the dielectric case 1020 may be slantedly arranged with respect to a vertical axis. The array antennas 1100*a* may be configured to radiate a wireless signal through the outer surface 1023*b* slantedly arranged with respect to the inner surfaces 1023*a* of the dielectric case 1020. The array antennas 1100*b* may be configured to radiate a wireless signal through the outer surface 1024*b* slantedly arranged with respect to the inner surface 1024*a* of the dielectric case 1020.

Figure 12:
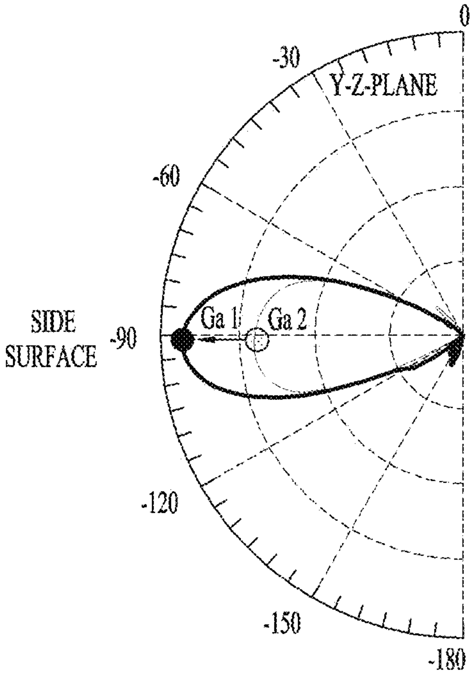
FIG. 12 shows a comparison of radiation patterns along a vertical axis and a horizontal axis between an antenna module inside a slantedly arranged dielectric case of FIG. 8C and an antenna module in a vertically arranged dielectric case of FIG. 10.
Figure 12:
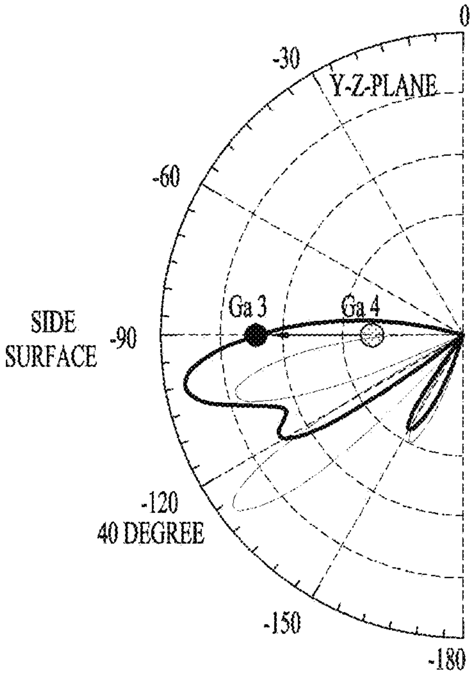

In this regard, FIG. 12 shows a comparison of radiation patterns along a vertical axis and a horizontal axis between an antenna module inside the slantedly arranged dielectric case of FIG. 8C and an antenna module in the vertically arranged dielectric case of FIG. 10. (a) of FIG. 12 shows a comparison between radiation patterns of an antenna module inside the slantedly arranged dielectric case of FIG. 8C and an antenna module in the vertically arranged dielectric case of FIG. 10 on an x-y plane, i.e., along a horizontal axis. (b) of FIG. 12 shows a comparison between radiation patterns of an antenna module inside the slantedly arranged dielectric case of FIG. 8C and an antenna module in the vertically arranged dielectric case of FIG. 10 on a y-z plane, i.e., along a vertical axis.

Referring to FIGS. 8C, 9 and 12, a structure of the dielectric case 1020 having the outer surface 1023*b* or 1024*b* slantedly located according to this specification may be referred to as a slanted dielectric structure. In the slanted dielectric structure, an outer edge of a mechanical structure in which an antenna module is placed is not arranged at a right angle but diagonally. The front surface portion 1021 of the dielectric case 1020 attached to the metal frame 1010 is configured to have a first length. On the other hand, the rear surface portion 1022 of the dielectric case 1020 is configured to have a second length smaller than the first length. Accordingly, the outer surfaces 1023*b* and 1024*b* of the dielectric case 1020 are each arranged at a slanted angle such that a length of a cross-section of the dielectric case 1020 decreases toward a lower region. Thus, an amount of electromagnetic waves radiating from the antenna module 1100 and directed toward the metal frame 1010 at an upper end may be reduced. An amount of electromagnetic waves reflected by the metal frame 1010 and directed to a lower region with respect to a side part may be reduced.

Meanwhile, an inner region of the dielectric case 1020 having the outer surface 1023*b* or 1024*b* arranged at a slanted angle may be configured as a partial dielectric structure. The dielectric case 1020 may be configured such that the outer surface 1023*b* or 1024*b* and the inner surface 1023*a* or 1024*a* have a predetermined thickness t1. The dielectric case 1020 may include a first dielectric structure 1020*a* arranged vertically at an inner end of the rear surface portion 1022 to correspond to a first height h1. An air material 1030 having a second height h2 may be arranged from an upper end portion of the first dielectric structure 1020*a* to an inner upper portion of the dielectric case 1020. The air material 1030 configured to have the second height h2 may also be referred to as a second dielectric structure.

The first dielectric structure 1020*a* and the second dielectric structure 1030 are made of different dielectric materials. A first permittivity of the first dielectric structure 1020*a* is configured to be higher than a second permittivity of the second dielectric structure. Accordingly, an amount of electromagnetic waves directed toward a side direction of the antenna module 1000 may be increased while an amount of electromagnetic waves directed upward may be decreased. Accordingly, an impact of the metal frame 1010 arranged above the dielectric case 1020 on a radiation pattern of the antenna module 1100 may be reduced. For example, the first permittivity of the first dielectric structure 1020*a* may be configured as about 2.5, and the second permittivity of the second dielectric structure 1030, which is an air layer, may be configured as 1.

Referring to FIGS. 8C and 9 and (a) of FIG. 12, a 2D radiation pattern generated along the x-y plane in a horizontal direction by the array antenna 1100*a* of the antenna module 1100 arranged within the dielectric case 1020 having a slanted form has a left-right symmetrical form with respect to a side region. In this regard, the outer surface 1023*b* of the dielectric case 1020 attached to the metal frame 1010 may be slantedly arranged, and the inner surface 1023 may be configured to have a step structure. On the other hand, a radiation pattern of an antenna module inside the dielectric case 1020-1 attached to the metal frame 1010 and having the outer surface 1023*b*-1 arranged vertically is distorted in a left-right asymmetric form. A gain value Ga1 of the antenna module 1100 placed within the dielectric case 1020 having a slanted form is approximately 5 dB greater than a gain value Ga2 of an antenna module inside the dielectric case 1020-1 having a vertical form.

Referring to FIGS. 8C and 9 and (b) of FIG. 12, a 2D radiation pattern along the y-z plane in a vertical direction through the array antenna 1100*a* of the antenna module 1100 arranged in the dielectric case 1020 having a slanted form is generated in a lower direction of a side region. As described above, with respect to the dielectric case 1020 attached to the metal frame 1010, the outer surface 1023*b* may be slantedly arranged and the inner surface 1023 may be configured to have a step structure.

On the other hand, a radiation pattern of the antenna module inside the dielectric case 1020-1 attached to the metal frame 1010 and having the outer surface 1023*b*-1 arranged vertically is generated in a further lower direction. In the radiation pattern of the antenna module inside the dielectric case 1020-1 having a vertical form, two main lobes are generated in a certain coverage area and a null is caused between the main lobes, thus worsening radiation performance. The antenna module inside the dielectric case 1020-1 has radiation performance worsened in a side region, as other main lobs occur at an angle of about 40 degrees in a lower direction with respect to the side region.

In comparison, in a radiation pattern of the antenna module 1100 arranged in the dielectric case 1020 having a slanted form, side lobes that occur at approximately 40 degrees in a lower direction are also reduced. This is an effect obtained by reducing an amount of electromagnetic waves reflected from the metal frame 1010 at an upper end. A gain value Ga3 of the antenna module 1100 arranged in the dielectric case 1020 having a slanted form is greater than a gain value Ga4 of the antenna module inside the dielectric case 1020-1 having a vertical form.

Referring to FIGS. 7A to 9 and (a) of FIG. 12, the 1×N array antennas 1100*a* and 1100*b* may each generate a first radiation pattern having a first beam width in one axial direction of a horizontal plane. Referring to FIGS. 7A to 9 and (b) of FIG. 12, the 1×N array antennas 1100*a* and 1100*b* may generate a second radiation pattern having a second beam width within a predetermined angular range in a lower direction of the metal case. In this regard, such a characteristic that the second beam width is greater than the first beam width is present. Therefore, the 1×N array antennas 1100*a* and 1100*b* may each perform beam forming while generating a directional beam with the first beam width in one axial direction of a horizontal plane. The 1×N array antennas 1100*a* and 1100*b* may generate a directional beam with the second beam width within a certain coverage downwardly in another axial direction which is a vertical axial direction.

As described above, an antenna radiation pattern and a gain may be optimized as shown in FIG. 12 by adjusting a slanted angle of each of the outer surfaces 1023*b* and 1024*b* of the dielectric case 1020. Additionally, by optimizing the height h from a particular layer of the multi-layered substrate to an upper end of the first dielectric structure 1020*a*, an antenna radiation pattern and a gain may be optimized as shown in FIG. 12.

Figure 13A:
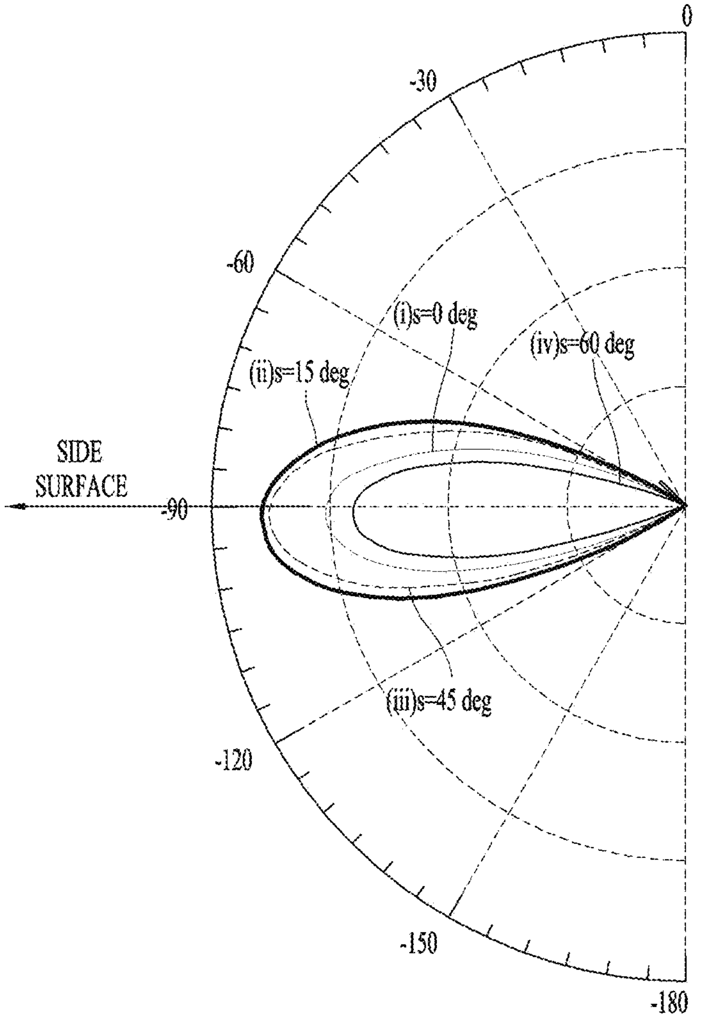
FIG. 13A shows radiation patterns on an x-y plane which is a horizontal plane, according to changes in a slanted angle of a dielectric case.

In this regard, FIG. 13A shows radiation patterns on an x-y plane which is a horizontal plane, according to changes in a slanted angle of a dielectric case. Referring to FIGS. 7A to 9 and 13A, as a slanted angle s of each of the outer surfaces 1023*b* and 1024*b* of the dielectric case 1020 increases to 15 degrees, 30 degrees, and 45 degrees, an antenna gain in a side direction is increased. However, when the slanted angle s of each of the outer surfaces 1023*b* and 1024*b* is 60 degrees, an antenna gain in the side direction decreases. Accordingly, the outer surfaces 1023*b* and 1024*b* of the dielectric case 1020 may be each slantedly arranged at an angle of 60 degrees or less with respect to a vertical axis. The outer surfaces 1023*b* and 1024*b* of the dielectric case 1020 may be each slantedly arranged at an angle of 15 degrees to 45 degrees with respect to 30 degrees along a vertical axis.

Figure 13B:
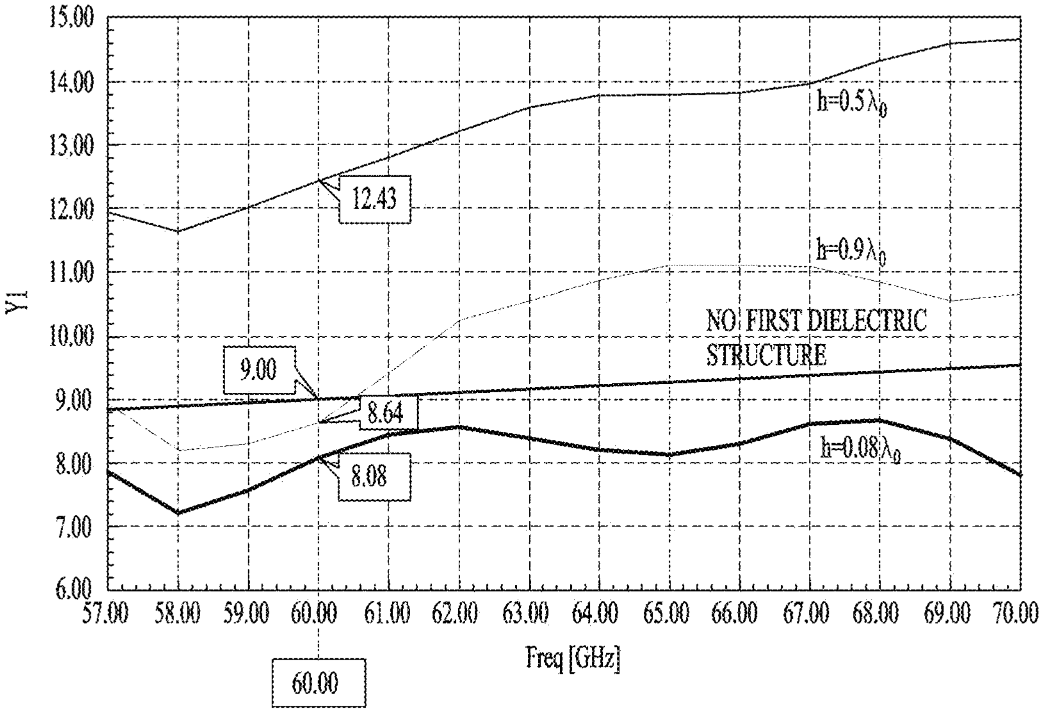
FIG. 13B shows antenna gains for each frequency according to height changes from a particular layer of the multi-layered substrate to an upper end of a first dielectric structure.

FIG. 13B shows antenna gains for each frequency according to height changes from a particular layer of the multi-layered substrate to an upper end of a first dielectric structure. FIG. 13B shows antenna peak gains in a side region according to a change in the height h from a particular layer of the multi-layered substrate to an upper end of the first dielectric structure. This indicates an antenna peak gain in a side region according to a change in the height h in a frequency band of 57 GHz to 70 GHz.

Referring to FIGS. 7A to 9 and 13B, the multi-layered substrate of the antenna module 1100 may be arranged in a lower region of a dielectric case 1020*a* in which the first dielectric structure 1020*a* is arranged. The array antennas 1100*a* and 1100*b* of the antenna module 1100 may be each configured to radiate a wireless signal in a frequency band between 57 GHz and 70 GHz. The height h from the particular layer of the multi-layered substrate on which antenna elements of the array antenna 1100*a* or 1100*b* are arranged to an upper end of the first inner surface 1023*a*-1, 1024*a*-1, 1023*b*, or 1024*b* may be configured in a range of $0.08\lambda_0$ to $0.9\lambda_0$.

The dielectric case 1020-1 or 1020 having a first inner surface 1023*a*-1, 1024*a*-1, 1023*b*, or 1024*b* arranged therein may constitute a first dielectric structure 1020*a*-1 or 1020*a*. As an example, the height h to an upper end of the first dielectric structure 1020*a* may be configured as 1.4 mm. Since a wavelength $\lambda_0$ corresponding to 60 GHz is 5 mm, when the height h to the upper end is 1.4 mm, this corresponds to $0.28\lambda_0$ in units of a wavelength.

The dielectric case 1020-1 or 1020 having a second inner surface 1023*a*-1, 1024*a*-1, 1023*b*, or 1024*b* arranged therein may constitute a first dielectric structure 1020*a*-1 or 1020*a*. As an example, the height h to an upper end of the first dielectric structure 1020*a* may be configured as 1.4 mm. Since a wavelength $\lambda_0$ corresponding to 60 GHz is 5 mm, when the height h to the upper end is 1.4 mm, this corresponds to $0.28\lambda_0$ in units of a wavelength.

When only the antenna module 1100 is present, a peak gain at 60 GHz in a side direction is 9 dBi. Meanwhile, when the height h from an antenna element inside the dielectric case 1020 having a slanted form to an upper end of the first dielectric structure 1020*a* below the metal frame 1010 is $0.08\lambda_0$, a peak gain of 8.1 dBi is obtained at 60 GHz, resulting in a gain decrease by 0.9 dB. On the other hand, when the height h to the upper end of the first dielectric structure 1020*a* is $0.5\lambda_0$, a peak gain of 12.4 dBi is obtained, resulting in a 3.4 dB gain increase. Meanwhile, when the height h is $0.9\lambda_0$, a peak gain of 8.6 dBi is obtained, thus resulting in a slight gain decrease. Accordingly, a height from a particular layer of the multi-layered substrate on which antenna elements are arranged to an upper end of the first dielectric structure 1020*a* In a frequency band between 57 GHz and 70 GHz may be configured in a range of $0.08\lambda_0$ to $0.9\lambda_0$. Here, $\lambda_0$ represents an electrical length of one wavelength in air at an operating frequency.

As described above, an antenna radiation pattern and a gain may be optimized as shown in FIG. 12, by adjusting a height of the air material 1030 in the dielectric case 1020. Additionally, a gap distance between the multi-layered substrate and the first dielectric structure 1020*a* may be adjusted to optimize an antenna radiation pattern and a gain as shown in FIG. 12.

Figure 14A:
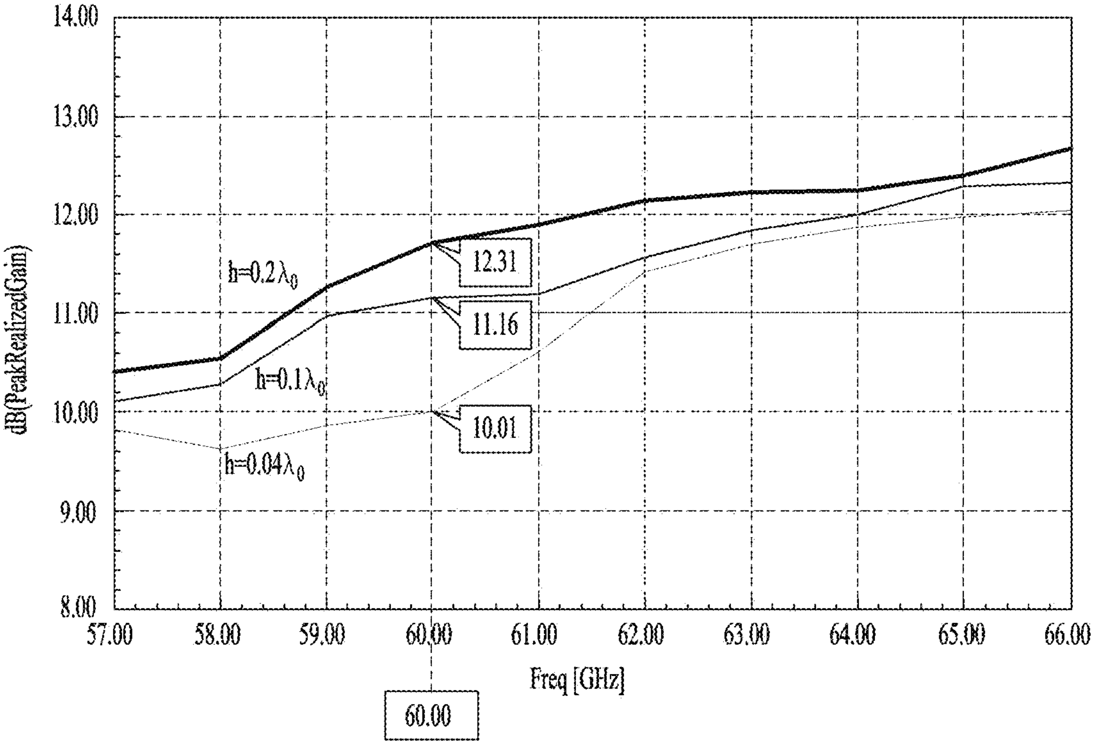
FIG. 14A shows an antenna gain for each frequency according to changes in a height of an air layer inside a dielectric case.

In this regard, FIG. 14A shows an antenna gain for each frequency according to changes in a height of an air layer inside a dielectric case. Referring to FIGS. 7A to 9 and 14A, when a second height h2 of the air material 1030 is $0.04\lambda_0$, a peak gain has a value of 10.0 dBi at 60 GHz. A low gain value is obtained at a frequency of 61.5 GHz or lower. However, when the second height h2 of the air material 1030 is configured to have a higher value, i.e., $0.1\lambda_0$ and $0.2\lambda_0$, a peak gain at 60 GHz has a value of 11.2 dBi or 11.7 dBi. Therefore, when the second height h2 of the air material 1030 increases to $0.04\lambda_0$ or greater, a peak gain may be maintained to have a certain value or higher. In particular, when the second height h2 of the air material 1030 increases to $0.1\lambda_0$ or higher, performance in a low frequency band of 60 GHz or less is relatively greatly improved. Accordingly, the second height h2 in which the air material 1030 is located from an upper end of the second inner surface 1023*a*-1, 1024*a*-1, 1023*b*, or 1024*b* to the upper end of the first inner surface 1023*b*-1, 1024*b*-1, 1023*c*, or 1024*c* of the dielectric case 1020 may be configured to have a value of $0.04\lambda_0$ or greater. To increase a gain in a low frequency band of 60 GHz or less, the second height h2 of the air material 1030 from the upper end of the first dielectric structure 1020*a* to an inner upper end of the dielectric case 1020 may be configured to have a value of $0.1\lambda_0$ or greater.

Figure 14B:
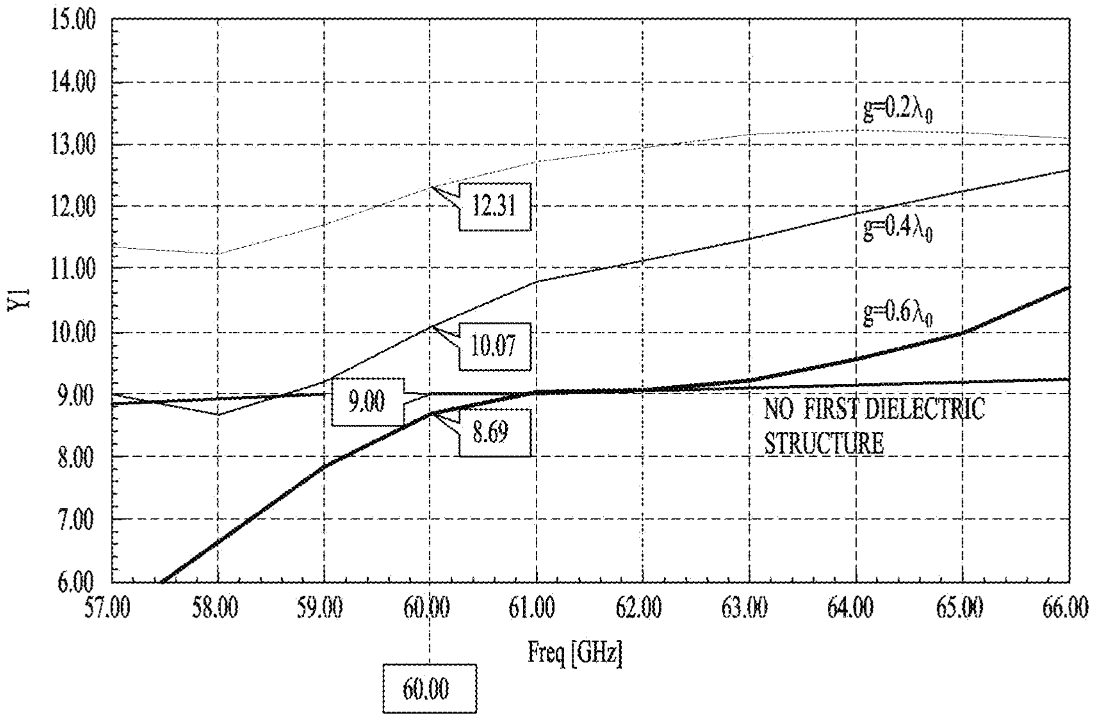
FIG. 14B shows an antenna peak gain for each frequency according to changes in a gap distance between a multi-layered substrate and a first dielectric structure.

FIG. 14B shows an antenna peak gain for each frequency according to changes in a gap distance between a multi-layered substrate and a first dielectric structure. Referring to FIGS. 7A to 9 and 14B, when a distance G1 corresponding to a gap between the multi-layered substrate of the antenna module 1100 and the first dielectric structure 1020*a* increases, a thickness t3 of a lower end of the first dielectric structure 1020*a* decreases. In this regard, when the distance G1 increases from $0.2\lambda_0$, $0.4\lambda_0$, to $0.6\lambda_0$, the thickness t3 of the lower end of the first dielectric structure 1020*a* decreases from $0.6\lambda_0$, $0.4\lambda_0$, to $0.2\lambda_0$.

As the distance G1 corresponding to the gap between the multi-layered substrate of the antenna module 1100 and the first dielectric structure 1020*a* increases, a peak gain of the antenna module 1100 shows attenuation characteristics. Therefore, a maximum value of the distance G1 corresponding to the gap is present, and when the gap is implemented, the gap needs to be less than or equal to the maximum value of the distance G1.

When the distance G1 corresponding to the gap is $0.6\lambda_0$, it may be checked that a peak gain of 8.7 dBi is obtained at 60 GHz and performance is severely attenuated in a low frequency band of the operating bandwidth. However, when the distance G1 corresponding to the gap is $0.4\lambda_0$ or $0.2\lambda_0$, it may be checked that performance of the peak gain at 60 GHz is improved to 10.1 dBi or 12.3 dBi. Therefore, the distance G1 between an inner side of the first dielectric structure 1020*a*-1 or 1020*a* and the multi-layered substrate of the antenna module 1100 may be configured to have a value of $0.6\lambda_0$ or less. That is, a distance between the first inner surface 1023*a*-1, 1024*a*-1, 1023*b*, or 1024*b* of the dielectric case 1020-1 or 1020 and the multi-layered substrate may be configured to have a value of $0.6\lambda_0$ or less. Meanwhile, the thickness t3 of the lower end of the first dielectric structure 1020*a* may be configured to have a value greater than or equal to $0.2\lambda_0$.

Figure 15:
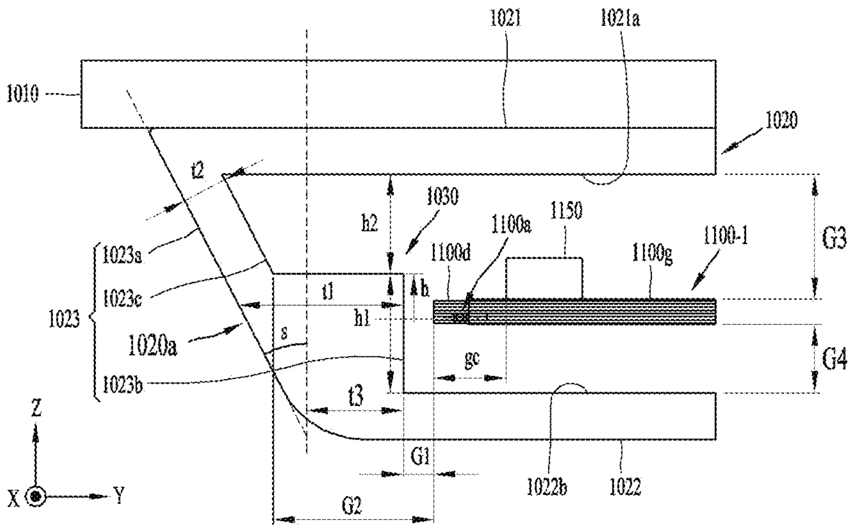
FIG. 15 shows a structure in which a metal case is arranged on a multi-layered substrate of an antenna module placed inside a dielectric case according to this specification.
Figure 16:
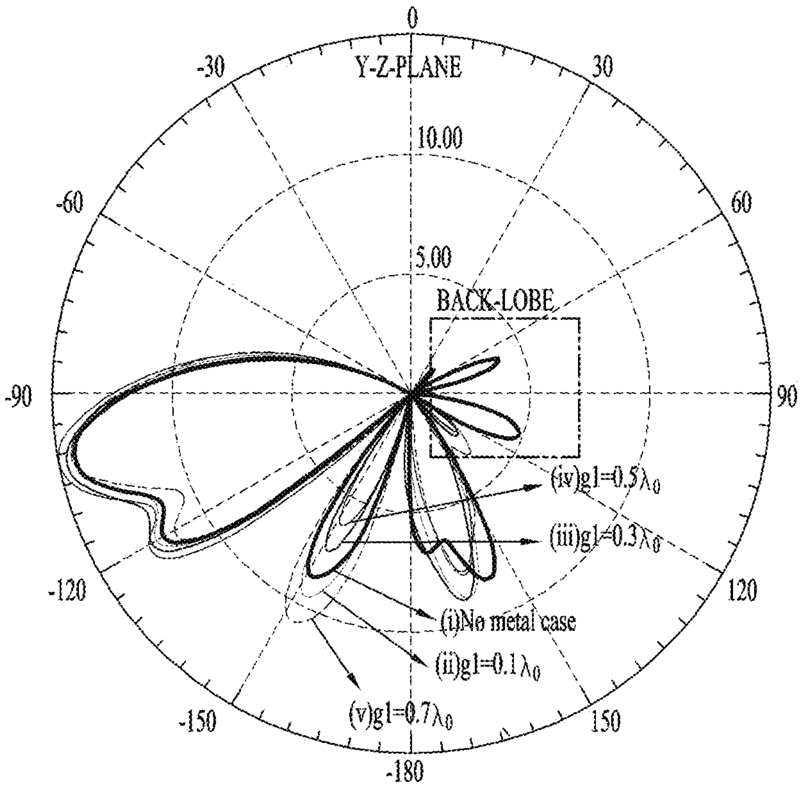
FIG. 16 shows a change in a radiation pattern according to a distance between a metal case and an antenna element.

Meanwhile, a metal case may be arranged on a multi-layered substrate of an antenna module arranged inside a dielectric case according to this specification to optimize an antenna radiation pattern. In this regard, FIG. 15 shows a structure in which a metal case is arranged on a multi-layered substrate of an antenna module placed inside a dielectric case according to this specification. FIG. 16 shows a change in a radiation pattern according to a distance between a metal case and an antenna element.

Referring to FIGS. 7A to 9 and 15, an electronic device having the antenna module 1100 may further include a metal case 1150 arranged on an upper portion of the multi-layered substrate. The metal case 1150 of FIG. 15 is not limited to being arranged inside the dielectric case 1020 having the slanted form of FIGS. 8C and 8D. The metal case 1150 of FIG. 15 may also be arranged inside the dielectric case 1020-1 having the vertical form of FIGS. 8A and 8B. In this regard, the ground region 1100*g* located inside the multi-layered substrate may be configured as a connecting portion 1150 electrically connected to the metal frame 1010. The connecting portion 1150 may be implemented as the metal case 1150 placed on the upper portion of the multi-layered substrate.

The metal case 1150 is arranged on the ground region 1100*g* of the antenna module 1100 to be configured to block electromagnetic waves directed toward the metal frame 1010. Accordingly, the metal case 1150 may be referred to as a back metal structure. The metal case 1150 is placed on a rear surface of the antenna module 1100 in an opposite direction to a radiation direction of the antenna module 1100.

The metal case 1150 may have a metal structure that functions as a PCB fixing support engaged with a PCB configured as a multi-layered substrate or bonded to the PCB by an adhesive to stably fix the PCB to the dielectric case 1020. The metal case 1150 may be a component attached to the PCB, such as a shield can.

Antenna elements of each of the array antennas 1100*a* and 1100*b* may be placed in a first region 1100*d* corresponding to a radiator region of the multi-layered substrate implemented as the antenna module 1100. The first region 1100*d* corresponding to the radiator region may be referred to as a dielectric region. The metal case may be arranged in a second region 1100*g* corresponding to a ground region of the multi-layered substrate. The second region 1100*g* may be referred to as a ground region.

A distance gc from an end-fire antenna element arranged on a particular layer of the antenna module 1100 of the multi-layered substrate to a starting point of the metal case 1150 may be configured to be within a predetermined range. For example, the distance gc may be configured as 1.5 mm and correspond to $0.3\lambda_0$ with respect to 60 GHz. The distance gc from a position in which the antenna elements arranged in the first region 1100*d* are located to one side end of the metal case 1150 may be configured as $(n+0.1)*\lambda_0<gc<(n+0.7)*\lambda_0$. Here, n is characterized as being 0 or a natural number.

The metal case 1150 is arranged on the first dielectric structure 1020*a*, but is configured to have a predetermined thickness such that a partial region thereof may be placed on the air material 1030. In this regard, a partial region of the metal case 1150 may be arranged on the air layer, which is an upper region of the first dielectric structure 1020*a*. A position of a lower end of the metal case 1150 combined with the ground region in an upper end of the multi-layered substrate may be arranged at a lower position than an upper end of the first dielectric structure 1020*a*. An upper end of the metal case 1010 may be located at a higher position than that of the upper end of the first dielectric structure 1020*a*.

The metal case 1150 may be configured to have a hexahedral structure including a front surface, a rear surface, and side surfaces. The metal case 1150 may be combined with the metal frame 1010 directly or through a separate combination structure. The metal case 1150 may be combined with the ground region 1100*g* of the multi-layered substrate of the antenna module 1100.

Referring to FIGS. 15 and 16, a side lobe may be reduced in a lower direction on a y-z plane, which is a vertical plane, by the metal case 1150 having a back metal structure. Thus, a phenomenon of interference with an interference signal received from other directions may be reduced. Side lobe characteristics change depending on a distance gc=g1 depending on a position in which the metal case 1150 is placed. As the distance g1 increases from $0.1\lambda_0$ to $0.5\lambda_0$, side lobe levels of (ii) a second radiation pattern to (iv) a fourth radiation pattern decrease. However, as the distance g1 increases to $0.7\lambda_0$, a side lobe level of (v) a fifth radiation pattern increases. However, as the distance g1 increases from $0.1\lambda_0$ to $0.7\lambda_0$, a peak gain of a main lobe is higher than that of a main lobe of (i) a first radiation pattern without a metal case. In addition, a back lobe hardly occurs even when the distance g1 increases from $0.1\lambda_0$ to $0.7\lambda_0$, whereas a back-lobe occurs in (i) the first radiation pattern without the metal case. Therefore, an effect of completely reducing a back lobe by the metal case 1150 regardless of the distance g1 is obtained. Accordingly, the distance gc from a position in which the antenna elements are arranged in the first region 1100*d* to one side end of the metal case 1150 may be configured as $(n+0.1)*\lambda_0<gc<(n+0.7)*\lambda_0$. Here, n is characterized as being 0 or a natural number.

Figure 17A:
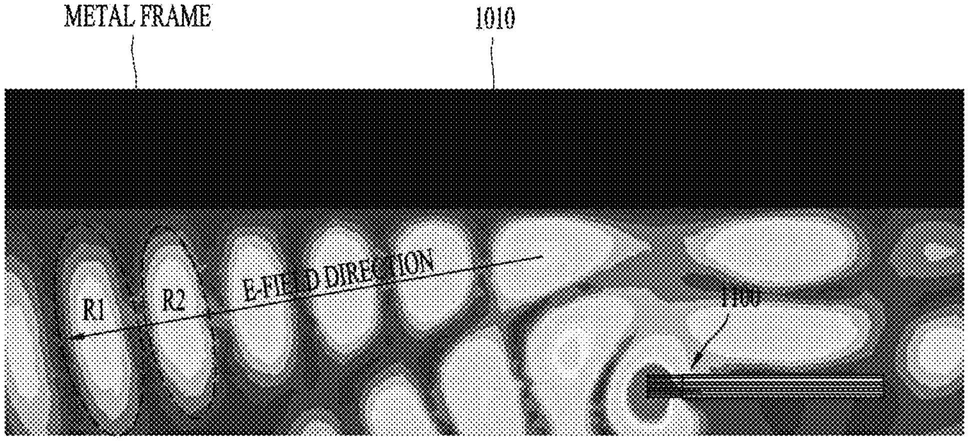
FIG. 17A shows an electric field distribution in which a deformation occurs in an electric field generated in an antenna module due to a metal frame.
Figure 17B:
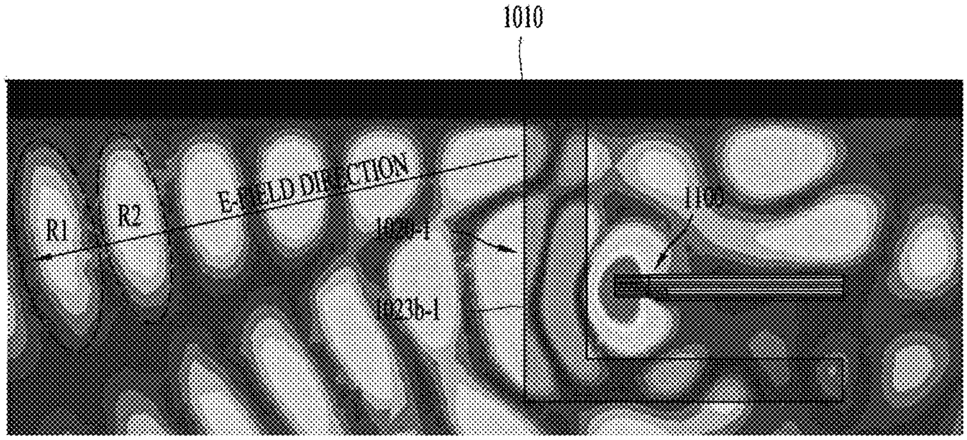
FIG. 17B shows an electric field distribution when a dielectric case having an outer surface in the vertical structure of FIG. 10 is arranged on a lower region of the metal frame.

Meanwhile, a distribution of an electric field generated by an antenna module according to this specification may be modified by a metal frame and the electric field distribution may be improved depending on a shape of a dielectric case. In this regard, FIG. 17A shows an electric field distribution in which a deformation occurs in an electric field generated in an antenna module due to a metal frame. FIG. 17B shows an electric field distribution when a dielectric case having an outer surface in the vertical structure of FIG. 10 is arranged on a lower region of the metal frame.

Referring to FIG. 17A, when the metal frame 1010 is placed on the antenna module 1100, a distribution of an electric field radiated from the antenna module 1100 is slantedly generated at a predetermined first angle with respect to a horizontal plane. Therefore, a propagation direction of the electric field is directed so that a distribution thereof is slanted at a predetermined angle with respect to the horizontal plane. Referring to propagation directions of electric fields in first and second regions R1 and R2, an electromagnetic wave radiated from the antenna module 1100 is reflected by the metal frame 1010 and propagates in a lower direction rather than a side direction.

Referring to FIGS. 10 and 17B, an electric field distribution radiated from the antenna module 1100 placed in the dielectric case 1020-1 in a rectangular structure having the outer surface 1023*b*-1 arranged vertically is also slantedly generated at a predetermined second angle with respect to the horizontal plane. The second angle, i.e., a slanted angle of the electric field distribution has a smaller value due to the dielectric case 1020-1, compared to that of the first angle which is a slanted angle in a structure having only the metal frame 1010. However, distortion of a radiation pattern still occurs due to deformation of the electric field distribution. Referring to propagation directions of electric fields in first and second regions R1 and R2, an electromagnetic wave radiated from the antenna module 1100 is reflected by the metal frame 1010 and propagates in a lower direction rather than a side direction. Therefore, the deformation of the electric field distribution due to the metal frame 1010 may not be resolved by the dielectric case 1020-1 in a rectangular structure having the outer surface 1023*b*-1 arranged vertically.

Figure 18A:
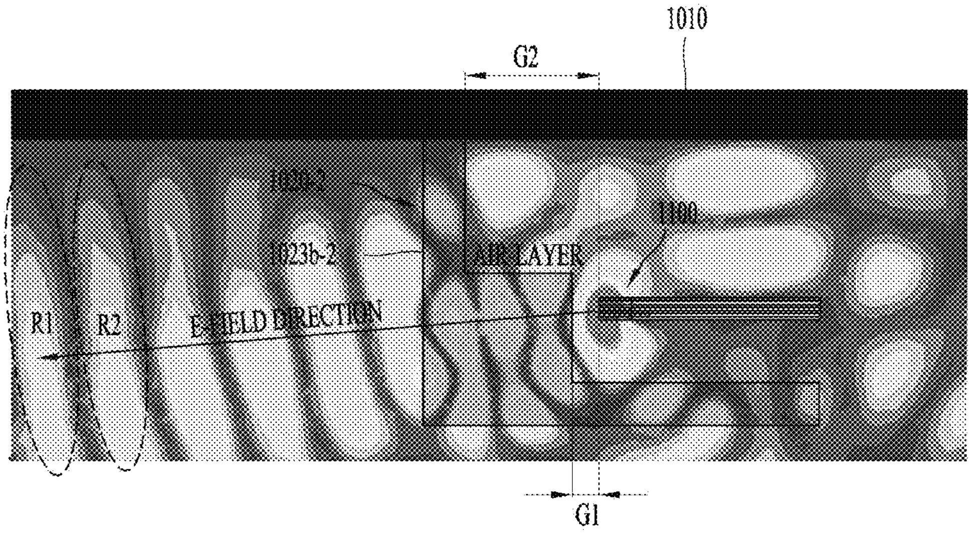
FIG. 18A shows an electric field distribution in a structure in which an inner side of a dielectric case is constituted by a first dielectric structure and an air layer.
Figure 18B:
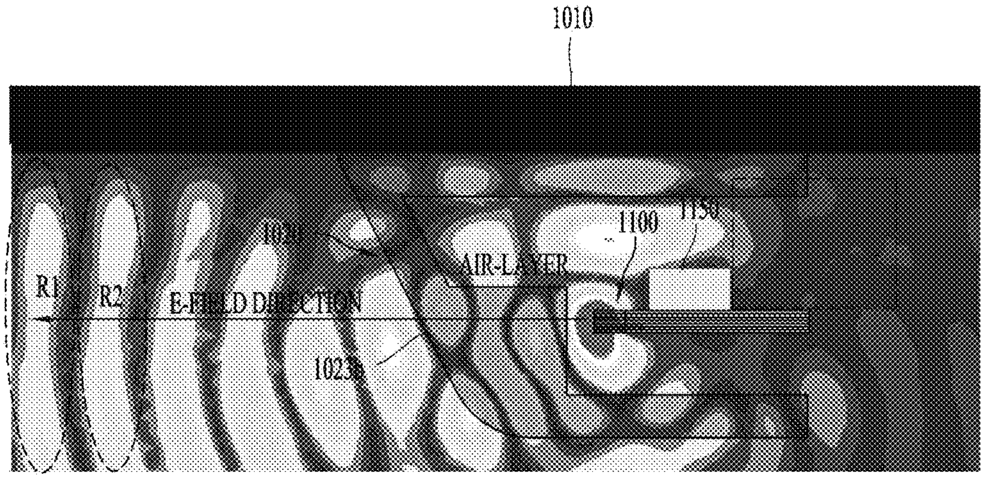
FIG. 18B shows an electric field distribution in a structure in an outer surface of a dielectric case is slantedly arranged while an inner side of the dielectric case is constituted by a first dielectric structure and an air layer.

Meanwhile, an electric field distribution deformed by a metal frame according to this specification may be improved by optimizing a shape of a dielectric case. In this regard, FIG. 18A shows an electric field distribution in a structure in which an inner side of a dielectric case is constituted by a first dielectric structure and an air layer. FIG. 18B shows an electric field distribution in a structure in an outer surface of a dielectric case is slantedly arranged while an inner side of the dielectric case is constituted by a first dielectric structure and an air layer.

Referring to FIG. 18A, an end of the antenna module 1100 may be spaced apart from inner surfaces of the dielectric case 1020-2 by different gaps, that is, a first gap G1 and a second gap G2. An inner side of the dielectric case 1020-2 is constituted by the first dielectric structure 1020*a* and the air material 1030, and an outer surface 1023*b*-2 of the dielectric case 1020-2 is arranged vertically. As the inner side of the dielectric case 1020-2 is constituted by the first dielectric structure 1020*a* and the air material 1030, an electric field distribution is generated at a slanted angle which is a third angle smaller than the second angle of FIG. 17B, with respect to a horizontal plane. Referring to propagation directions of electric fields in the first and second regions R1 and R2, it may be checked that an electromagnetic wave radiated from the antenna module 1100 is reflected by the metal frame 1010, and thus, a component that propagates in a lower direction is reduced. Accordingly, it may be checked that in the dielectric case 1020-2 including the first dielectric structure 1020*a* and the air material 1030, a component propagating in a lower direction decreases and a component propagating in a side direction increases, among components according to electric field propagation directions. However, since the outer surface 1023*b*-2 of the dielectric case 1020-2 is still arranged vertically, there is a limitation such that an electric field distribution may not be generated completely in parallel with a horizontal plane.

Referring to FIGS. 7A, 8C, 8D, 15, and 18B, the dielectric case 1020 is slantedly arranged at a predetermined angle with respect to a vertical axis. Therefore, an electric field distribution radiated from the antenna module 1100 placed inside the dielectric case 1020 having the outer surface 1023 or 1024 placed diagonally is shown. It may be checked that an amount of electric field components reflected from the metal frame 1010 is greatly reduced by the dielectric case 1020 having the outer surface 1023 or 1024 slanted in a diagonal form.

Referring to propagation directions of electric fields in the first and second regions R1 and R2, it may be checked that an electromagnetic wave radiated from the antenna module 1100 is reflected by the metal frame 1010, and thus, components that propagate in a lower direction is completely offset by the dielectric case 1020. Deformation of an electric field distribution has been completely resolved through a structure in the outer surface 1023*b* or 1024*b* of the dielectric case 1020 are slantedly arranged while an inner inside of the dielectric case 1020 is constituted by the first dielectric structure 1020*a* and the air material 1030. Accordingly, components of the electric field in a lower direction are completely offset by the dielectric case 1020 and only components in a side direction are present. Referring to propagation directions of electric fields in the first and second regions R1 and R2, an electromagnetic wave radiated from the antenna module 1100 may not be generated toward a rear surface due to the metal case 1150 arranged on the rear surface. It may be checked that the metal case 1150 is placed on a rear surface of the antenna module 1100 to significantly reduce rearward radiation of the antenna module 1100.

Figure 19:
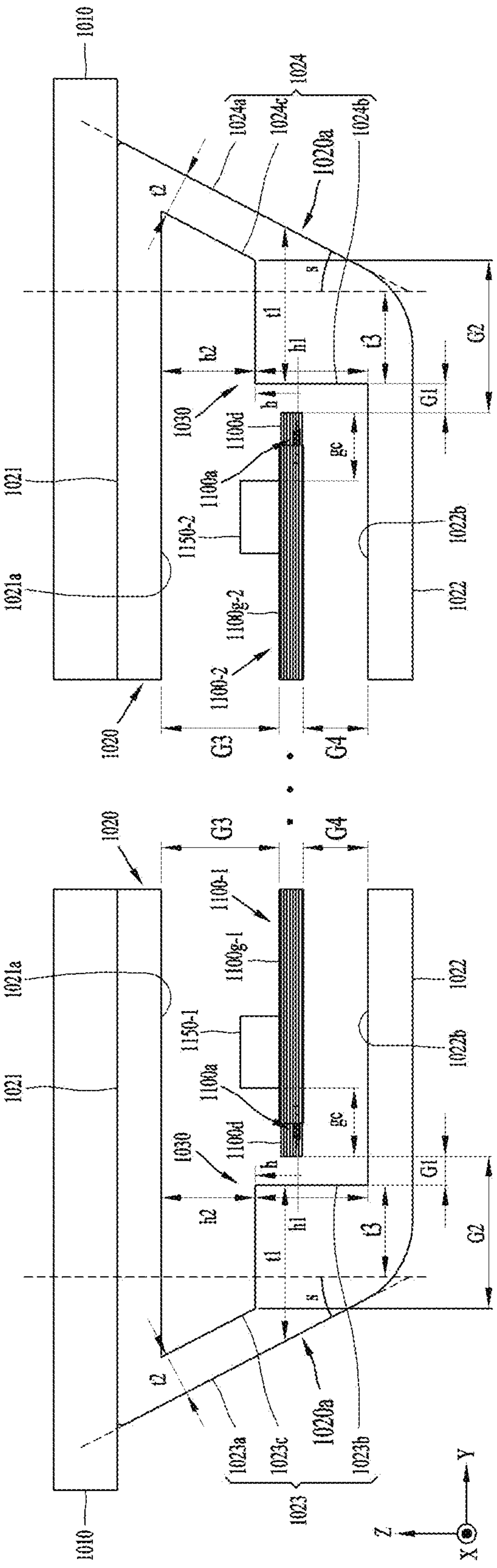
FIG. 19 illustrates an electronic device having antenna modules arranged in different regions in a dielectric case according to this specification.

An electronic device including an antenna module arranged in a dielectric case according to an aspect of this specification has been described above. Hereinafter, an electronic device having antenna modules arranged in different regions of a dielectric case according to another aspect of this specification is described. In this regard, all the technical features and configurations described above also apply to the description below. FIG. 19 illustrates an electronic device having antenna modules arranged in different regions in a dielectric case according to this specification.

Referring to FIGS. 1 to 19, the electronic device 1000 may include the metal frame 1010, the dielectric case 1020, the first antenna module 1100-1, the second antenna module 1100-2, and the air material 1030. The metal frame 1010 may be configured to constitute a side region of the electronic device 1000. The frame 1010 may be located to surround the display 151 and configured to support the display 151. The dielectric case 1020 may be located on one side of the metal frame 1010. The dielectric case 1020 may be placed on one side constituting a lower region of the metal frame 1010.

The first antenna module 1100-1 may be arranged on one side of an inner region of the dielectric case 1020. The first antenna module 1100-1 may be placed to face the inner surface 1023*a* of the dielectric case 1020. The second antenna module 1100-2 may be placed on another side of the inner region of the dielectric case 1020. The second antenna module 1100-2 may be placed to face the inner surface 1024*a* of the dielectric case 1020. The air material 1030 may be positioned between the dielectric case 1020 and the metal frame 1010.

The dielectric case 1020 may be configured to include a plurality of side parts (side surface portions). The dielectric case 1020 may be configured to include the first side part 1021, the second side part 1022, and the third side part 1023 or the fourth side part 1024. The first side part 1021 may be arranged to be attached to the metal frame 1010. The second side part 1022 may be arranged to correspond to the first side part 1021. The third side part 1023 and the fourth side part 1024 may be each arranged between the first side part 1021 and the second side part 1022. The first side part 1021 and the second side part 1022 may be referred to as the front surface portion 1021 and the rear surface portion 1022, respectively. The third side part 1023 and the fourth side part 1024 may be referred to as one side part 1023 and the another side part 1024, respectively.

The third side part 1023 and the fourth side part 1024 may be each slantedly arranged. Accordingly, a length of the first side part 1021 may be configured to be greater than a length of the second side part 1021. The outer surfaces 1023*a* and 1024*a* of the dielectric case 1020 may be each slantedly arranged at an angle of 15 to 45 degrees with respect to a vertical axis, thereby optimizing a direction and a size of a radiated signal. The outer surfaces 1023*a* and 1024*a* of the dielectric case 1020 may be each arranged at an angle of 60 degrees or less with respect to a vertical axis, thereby optimizing a direction and a size of a radiated signal.

The side parts of the dielectric case 1020 may include inner surfaces and outer surfaces corresponding to the inner surfaces. The outer surfaces 1023*a* and 1024*a* may be each slantedly arranged with respect to a vertical axis. The inner surfaces may include the first inner surface 1023*b* or 1024*b* and the second inner surfaces 1023*c* or 1024*c*. The first inner surface 1023*b* or 1024*b* may be arranged to face and be spaced to be apart, by the first gap G1, from a surface vertical to a longitudinal end of the array antenna 1100*a* or 1100*b* and one among the third or fourth side part 1023-1 or 1024-1 of the dielectric case 1020-1. The second inner surface 1023*c* or 1024*c* may be arranged to face and spaced apart, by the plurality of second gaps G2, from one surface among a vertical surface at an end of the array antenna 1100*a* or 1100*b* and the third or fourth side part 1023-1 or 1024-1 of the dielectric case 1020-1. A region of the second inner surface 1023*c* or 1024*c* may be arranged between the first inner surface 1023*b* or 1024*b* and the metal frame 1010.

The plurality of second gaps G2 may be arranged more widely than the first gap G1. The first thickness t1 between the first inner surface 1023*b* or 1024*b* and the outer surface 1023*a* or 1024*a* may be configured to be greater than the second thickness t2 between the second inner surface 1023*c* or 1024*c* and the outer surface 1023*a* or 1024*a*. The array antennas 1100*a* and 1100*b* may be configured to radiate a wireless signal through the outer surface 1023*a* and 1024*a* slantedly arranged with respect to the inner surfaces 1023*b* and 1023*c* or the inner surfaces 1024*b* and 1024*c* of the dielectric case 1020-1.

The first inner surface 1023*b* or 1024*b* may further include the inner surface 1022*b* in a lower region of the dielectric case 1020-1. The second inner surfaces 1023*c* and 1024*c* may each further include the inner surface 1021*a* in an upper region of the dielectric case 1020-1. The array antennas 1100*a* and 1100*b* of the dielectric case 1020-1 may be each spaced apart from the second inner surface 1021*a* of the dielectric case 1020-1 by the third gap G3. The array antennas 1100*a* and 1100*b* may be each spaced apart from the first inner surface 1022*b*-1 of the dielectric case 1020-1 by the fourth gap G4. The third gap G3 may be configured to be wider than the fourth gap G4.

The array antenna 1100*a* or 1100*b* may be arranged nearer a region of the first inner surface 1023*b* or 1024*b* than a region of the second inner surface 1023*c* or 1024*c* of the dielectric case 1020. The array antennas 1100*a* and 1100*b* may be each arranged nearer a region of the first inner surface 1022*b* than a region of the second inner surface 1021*a* of the dielectric case 1020. Accordingly, the array antennas 1100*a* and 1100*b* may each mainly radiate a wireless signal through one side surface, another side surface, and a lower region.

Connection portions 1150-1 and 1150-2 electrically connected to the metal frame 1010 may be further arranged in the ground region 1100*g*-1 and 1100*g*-2 placed inside the substrate, respectively. The connecting portion 1150 connected to the metal frame 1010 may be the metal case 1150 made of a metal material, but is not limited thereto.

The electronic device 1000 may further include first and second metal cases 1150-1 and 11150-2 arranged on upper portions of the first and second multi-layered substrates of the first and second antenna modules 1100-1 and 1100-2, respectively. Antenna elements of the first and second antenna modules 1100-1 and 1100-2 may be placed in the first regions 1100*d*-1 and 1100*d*-2 corresponding to radiator regions of the first and second multi-layered substrates. The first and second metal cases 1150-1 and 1150-2 may be placed in the second regions 1100*g*-1 and 1100*g*-2 corresponding to ground regions of the first and second multi-layered substrates, respectively.

Figure 20A:
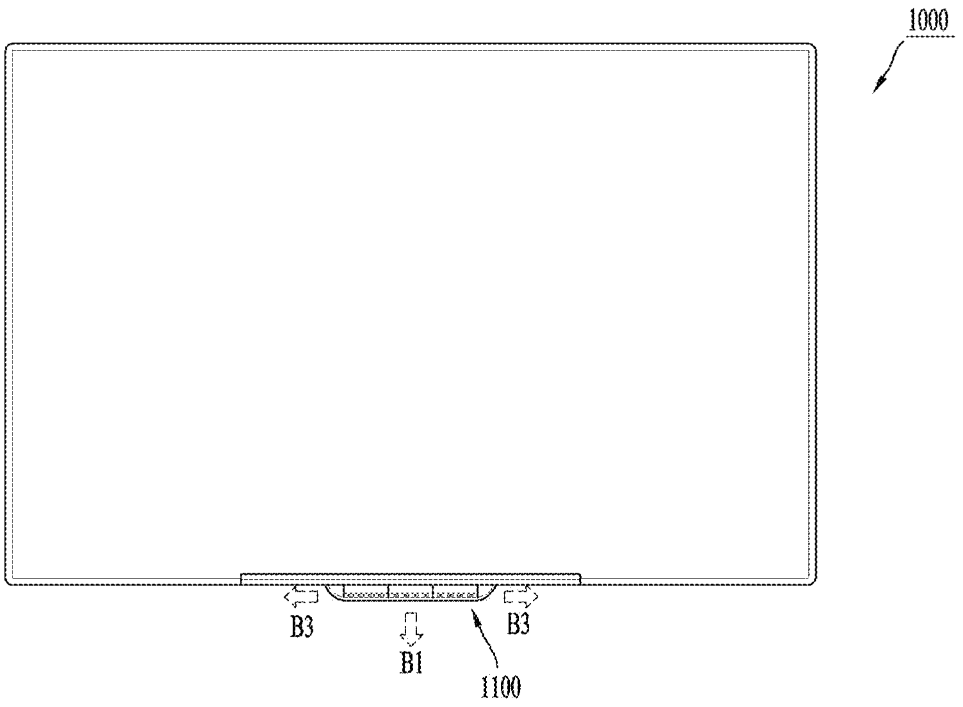
FIG. 20A illustrates a structure in which an antenna module in which a first type antenna and a second type antenna are configured as array antennas is arranged in an electronic device.
Figure 20B:
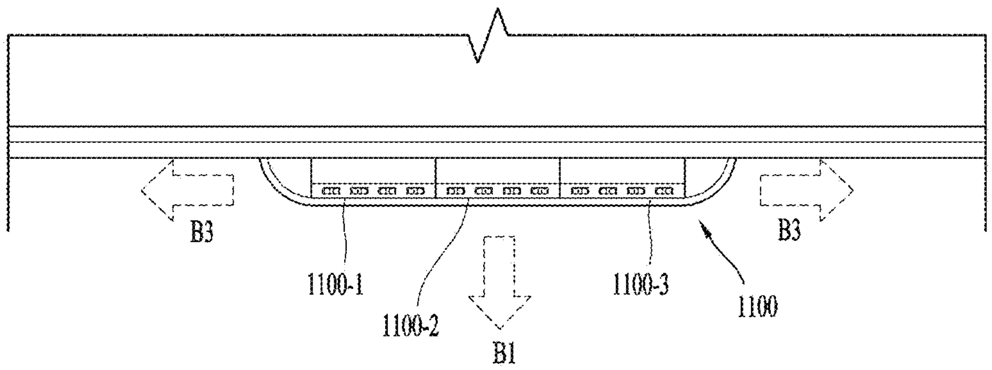
FIG. 20B is an enlarged view of a plurality of array antenna modules of FIG. 20A.

An antenna module arranged in a dielectric case disclosed herein may be configured as an array antenna in an electronic device. In this regard, FIG. 20A illustrates a structure in which an antenna module in which a first type antenna and a second type antenna are configured as array antennas is arranged in an electronic device. FIG. 20B is an enlarged view of a plurality of array antenna modules of FIG. 20A.

Referring to FIGS. 1 to 20B, an array antenna may include the first antenna module 1100-1 and the second antenna module 1100-2 arranged apart from the first antenna module 1100-1 by a predetermined gap in a first horizontal direction. Meanwhile, antenna modules are not limited to two antenna modules. Three or more antenna modules may be implemented as illustrated in FIG. 20B. Accordingly, the antenna modules may be configured to include first to third antenna modules 1100-1 to 1100-3.

The processor 1400 of FIGS. 5C to 6C may control to provide a first beam and a second beam in a first direction and a second direction using the first and second antenna modules 1100-1 and 1100-2, respectively. That is, the first beam may be generated from a horizontal direction toward the first direction using the first antenna module 1100-1. In addition, the second beam may be generated from a horizontal direction toward the second direction using the second antenna module 1100-2. In relation to this, the processor 1400 may perform MIMO using the first beam in the first direction and the second beam in the second direction.

The processor 1400 may provide a third beam in a third direction using the first and second antenna modules 1100-1 and 1100-2. In relation to this, the processor 1400 may control the transceiver circuit 1250 to synthesize signals received through the first and second antenna modules 1100-1 and 1100-2. Also, the processor 1400 may control signals transmitted to the first and second antenna modules 1100-1 and 1100-2 through the transceiver circuit 1250 to be distributed to each antenna element. The processor 1400 may perform beamforming using a third beam having a beam width smaller than beam widths of the first beam and the second beam.

The processor 1400 may perform MIMO using the first beam in the first direction and the second beam in the second direction, and perform beamforming using the third beam having a beam width smaller than beam widths of the first and second beams. In relation to this, when quality of the first signal and the second signal received from another electronic device in a periphery of the electronic device is equal to or less than a threshold, beamforming may be performed using the third beam.

A number of elements of the array antenna is not limited to two, three, four, or the like as illustrated in the drawing. For example, the number of the elements of the array antenna may extend to 4, 8, 16, or the like. Accordingly, the array antenna may be configured as a 1×2, 1×3, 1×4, 1×5, or 1×8 array antenna.

Figure 21:
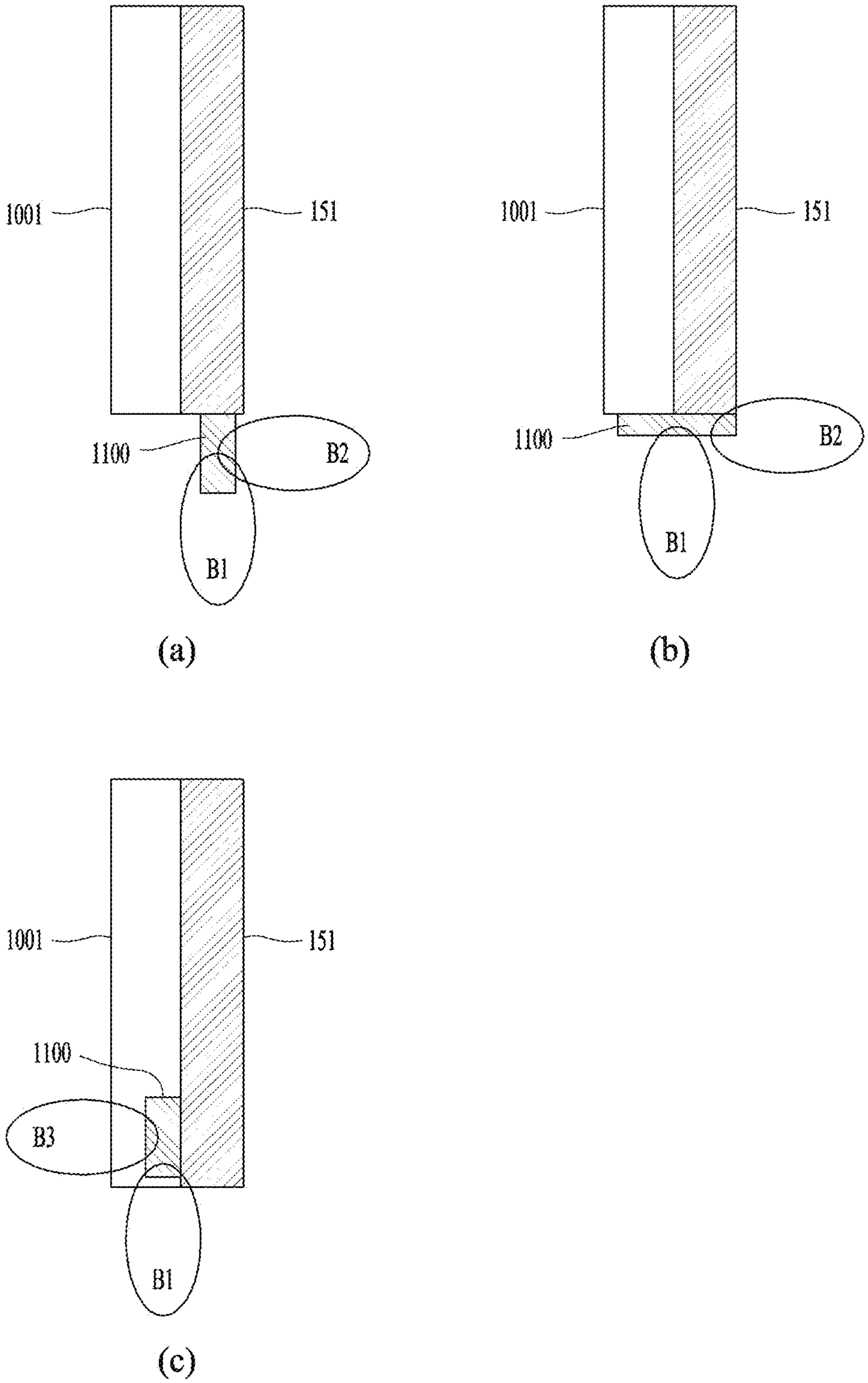
FIG. 21 illustrates an antenna module combined in varying combination structures at a particular position in an electronic device according to embodiments.

Meanwhile, FIG. 21 illustrates an antenna module combined in varying combination structures at a particular position in an electronic device according to embodiments. Referring to (a) of FIG. 21, the antenna module 1100 may be arranged on a lower region of the display 151 to be substantially horizontal with the display 151. Accordingly, a beam B1 may be generated in a lower direction of the electronic device through one array antenna among a plurality of array antenna modules. Meanwhile, another beam B2 may be generated in a front direction of the electronic device through another array antenna among the plurality of array antenna modules.

Referring to (b) of FIG. 21, the array antenna module 1100 may be arranged on a lower region of the display 151 to be substantially vertical to the display 151. Accordingly, a beam B2 may be generated in a front direction of the electronic device through one array antenna among the plurality of array antenna modules. Meanwhile, another beam B1 may be generated in a lower direction of the electronic device through another array antenna among the plurality of array antenna modules.

Referring to (c) of FIG. 21, the antenna module 1100 may be arranged in a rear case 1001 corresponding to a mechanical structure. The antenna module 1100 may be arranged substantially parallel to the display 151 in the rear case 1001. Accordingly, a beam B1 may be generated in a lower direction of the electronic device through one array antenna among a plurality of array antenna modules. Meanwhile, another beam B3 may be generated in a lower direction of the electronic device through another array antenna among the plurality of array antenna modules.

An antenna module arranged in a dielectric case and an electronic device including the antenna module have been described above. Hereinafter, technical effects of an antenna module arranged in a dielectric case according to this specification and an electronic device including the antenna module are to be described.

According to an embodiment, an antenna module may be arranged inside a dielectric case on a lower region of a metal frame of an electronic device to radiate a radio wave toward a side region in a millimeter wave band.

According to an embodiment, an antenna module that radiates a radio wave toward a side region may be arranged inside a dielectric case having an outer surface of a slanted structure to radiate a radio wave toward a side region even in a structure in which a metal frame is located.

According to an embodiment, radiation performance in a side direction may be enhanced by optimizing an outer shape of a dielectric case arranged below the metal frame to have a slanted structure, and placing a dielectric structure inside the dielectric structure to have a protruding structure while arranging an air layer.

According to an embodiment, antenna radiation performance may be enhanced using a partial dielectric technique for arranging an air layer in a dielectric case, a diagonal-type dielectric structure in which an outer surface is slantedly arranged, and a metal fixing device.

According to an embodiment, an antenna module may be arranged in different positions in a lower portion of an electronic device to perform wireless communication with various peripheral electronic devices in several directions.

Further scope of applicability of this specification will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

Further scope of applicability of this specification will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art. In relation to this specification described above, designing and driving of an antenna operating in a millimeter waver band and an electronic device controlling the antenna may be implemented as computer-readable codes on a medium having a program recorded thereon.

The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the control unit of the terminal. Therefore, it should also be understood that the above-described embodiments are not limited by any of the details of the foregoing description, unless otherwise specified, but rather should be construed broadly within its scope as defined in the appended claims, The scope of this specification should be determined by reasonable interpretation of the appended claims, and all changes within the scope of equivalents of this specification are included in the scope of this specification.

What is claimed is:

1. An electronic device comprising:

a metal frame coupled to a side region of the electronic device;

a dielectric case arranged at one side of the metal frame, wherein the dielectric case is shaped to include an inner region;

a first array antenna and a second array antenna, each arranged in respective substrates and located in the inner region of the dielectric case, wherein the dielectric case comprises a first side part coupled to the metal frame, a second side part corresponding to the first side part, and a third side part and a fourth side part each being arranged between the first side part and the second side part, the third side part comprises a first inner surface, a second inner surface, and a first outer surface, and the fourth side part comprises a first inner surface, a second inner surface, and a second outer surface, for the third side part, the first inner surface faces and is spaced apart, by a first gap, from a surface vertical to a longitudinal end of the first array antenna and the second inner surface faces and is spaced apart, by a second gap, from the surface vertical to the longitudinal end of the first array antenna, for the fourth side part, the first inner surface faces and is spaced apart, by the first gap, from the surface vertical to a longitudinal end of the second array antenna and the second inner surface faces and is spaced apart, by the second gap, from the surface vertical to the longitudinal end of the second array antenna, the second gap is wider than the first gap, for each of the third side part and the fourth side part, a first thickness between the first inner surface and a respective one of the first outer surface and the second outer surface is greater than a second thickness between the second inner surface and a respective one of the first outer surface and the second outer surface, the first array antenna is configured to radiate a wireless signal through the first inner surface and the second inner surface of the third side part and the first outer surface of the third side part, and the second array antenna is configured to radiate a wireless signal through the first inner surface and the second inner surface of the fourth side part and the second outer surface of the fourth side part.

2. The electronic device of claim 1, wherein each of the first array antenna and the second array antenna is spaced apart from an inner surface of the first side part by a third gap, each of the first array antenna and the second array antenna is spaced apart from an inner surface of the second side part by a fourth gap, and the third gap is wider than the fourth gap.

3. The electronic device of claim 1, wherein for each of the first array antenna and the second array antenna, a respective connecting portion is electrically connected to the metal frame and is further arranged in a ground region located inside a respective one of the substrates.

4. The electronic device of claim 3, wherein the respective substrates of the first array antenna and the second array antenna are each configured as a multi-layered substrate, antenna elements of the first array antenna and the second array antenna are arranged on a particular layer of a respective one of the multi-layered substrates, and the antenna elements of the first array antenna and the second array antenna are configured to respectively radiate the wireless signal as respective beamformed wireless signals.

5. The electronic device of claim 4, wherein the antenna elements of the first array antenna and the second array antenna comprise, on the particular layer of the respective one of the multi-layered substrates, a $1\times N$ array antenna in which antenna elements are arranged to be apart from each other in one axial direction by a predetermined gap, and the antenna elements of the $1\times N$ array antenna are end-fire radiators that radiate the wireless signals through one side surface of the respective one of the multi-layered substrates.

6. The electronic device of claim 5, wherein for each of the first array antenna and the second array antenna, the $1\times N$ array antenna is configured to:

generate a first radiation pattern having a first beam width in the one axial direction; and generate a second radiation pattern having a second beam width within a predetermined angle in a lower direction of the metal frame, and the second beam width is greater than the first beam width.

7. The electronic device of claim 4, wherein for each of the first array antenna and the second array antenna, the multi-layered substrate is arranged to be spaced apart from the first inner surface which is at a lower region of the dielectric case, the first array antenna and the second array antenna is configured to radiate the wireless signal in a frequency band between 57 GHz and 70 GHz, and for each of the third side part and the fourth side part, a height from the particular layer of the multi-layered substrate on which the antenna elements, for each of the first array antenna and the second array antenna, are positioned relative to an upper end of the first inner surface is has a value in a range of $0.08\lambda_0$ to $0.9\lambda_0$.

8. The electronic device of claim 7, wherein for each of the third side part and the fourth side part, a second height for which air is to be received from the upper end of the first inner surface to an upper end of the second inner surface has a value of $0.04\lambda_0$ or greater, and a distance between the first inner surface of the dielectric case and the multi-layered substrate has a value of $0.6\lambda_0$ or less.

9. The electronic device of claim 7, wherein for each of the first array antenna and the second array antenna, the respective connecting portion is implemented as a metal case arranged on an upper portion of the multi-layered substrate, the antenna elements of the first array antenna and the second array antenna are arranged in respective first regions corresponding to a radiator region of the multi-layered substrate, for each of the first array antenna and the second array antenna, the metal case is arranged in a second region corresponding to the ground region of the multi-layered substrate, and for each of the first array antenna and the second array antenna, a distance gc from a position in which the antenna elements are arranged to one side end of the metal case is $(n+0.1)*\lambda_0<gc<(n+0.7)*\lambda_0$, and n is 0 or a natural number.

* * * * *